(12) United States Patent
Otani

(10) Patent No.: US 10,708,466 B2
(45) Date of Patent: Jul. 7, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Ryosuke Otani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 16/027,530

(22) Filed: Jul. 5, 2018

(65) Prior Publication Data

US 2019/0020784 A1 Jan. 17, 2019

(30) Foreign Application Priority Data

Jul. 12, 2017 (JP) ................... 2017-136446

(51) Int. Cl.
*H04N 1/409* (2006.01)
*H04N 5/232* (2006.01)
*H04N 5/217* (2011.01)
*G06T 5/40* (2006.01)
*G06T 5/50* (2006.01)
*H04N 1/405* (2006.01)

(52) U.S. Cl.
CPC ............ *H04N 1/409* (2013.01); *G06T 5/40* (2013.01); *G06T 5/50* (2013.01); *H04N 1/405* (2013.01); *H04N 5/217* (2013.01); *H04N 5/23216* (2013.01)

(58) Field of Classification Search
CPC ........ H04N 1/409; H04N 1/405; H04N 5/217; H04N 5/23216; G06T 5/40; G06T 5/50
See application file for complete search history.

(56) References Cited

U.S. PATENT DOCUMENTS

| 2002/0171873 A1* | 11/2002 | Chang | H04N 1/40075 358/3.06 |
| 2005/0195442 A1* | 9/2005 | Inoue | H04N 1/4051 358/3.14 |
| 2006/0152764 A1* | 7/2006 | Loce | H04N 1/40068 358/3.06 |
| 2012/0026544 A1* | 2/2012 | Yanai | H04N 1/4055 358/1.15 |
| 2012/0127535 A1* | 5/2012 | Ochiai | H04N 1/4055 358/3.06 |
| 2013/0208998 A1* | 8/2013 | Yoshizawa | G06T 3/00 382/293 |

(Continued)

FOREIGN PATENT DOCUMENTS

| JP | 2016-136374 | * 7/2016 | ............... G06T 5/00 |
| JP | 2016-136374 A | 7/2016 | |

*Primary Examiner* — David F Dunphy
(74) *Attorney, Agent, or Firm* — Venable LLP

(57) ABSTRACT

An image processing apparatus according to an embodiment of the present invention includes: a first generation unit that generates a low-frequency image by extracting a low-frequency component from an input image; a second generation unit that generates a high-frequency image by extracting a high-frequency component from the input image; a screen processing unit that generates an AM screen image by performing AM screen processing on the low-frequency image; an addition processing unit that generates an added image by adding the high-frequency image to the AM screen image; and a correction unit that corrects the added image.

20 Claims, 21 Drawing Sheets

(56) References Cited

U.S. PATENT DOCUMENTS

2014/0301745 A1 10/2014 Otani
2016/0127608 A1* 5/2016 Katsuyama ............ B41J 2/2054
358/3.06

* cited by examiner

|   |   |   |   |   |   |   |   |   |
|---|---|---|---|---|---|---|---|---|
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |

AVERAGE : 184

FIG.5B

AVERAGE : 184

FIG.5C AVERAGE : 0

AVERAGE : 184

FIG.8A

AVERAGE : 184

FIG.8B

AVERAGE : 171

| 255 | 188 | 139 | 255 | 255 | 255 | 255 | 255 | 255 | 255 | 255 | 130 | 249 | 255 | 255 | 255 | 255 | 255 | 183 |
|---|---|---|---|---|---|---|---|---|---|---|---|---|---|---|---|---|---|---|
| 58 | 255 | 197 | 141 | 255 | 69 | 52 | 255 | 255 | 255 | 255 | 0 | 0 | 255 | 255 | 255 | 255 | 255 | 127 |
| 95 | 108 | 255 | 210 | 140 | 49 | 58 | 75 | 255 | 255 | 255 | 11 | 0 | 0 | 255 | 255 | 255 | 255 | 161 |
| 255 | 255 | 255 | 255 | 187 | 139 | 255 | 255 | 255 | 255 | 255 | 255 | 130 | 249 | 255 | 255 | 255 | 255 | 255 |
| 255 | 255 | 113 | 57 | 255 | 197 | 141 | 255 | 69 | 52 | 255 | 255 | 255 | 255 | 0 | 0 | 255 | 255 | 255 |
| 255 | 255 | 135 | 95 | 108 | 255 | 210 | 140 | 49 | 58 | 75 | 255 | 255 | 255 | 11 | 0 | 0 | 255 | 255 |
| 82 | 255 | 255 | 255 | 255 | 255 | 255 | 187 | 139 | 255 | 255 | 255 | 255 | 255 | 255 | 255 | 130 | 249 | 255 |
| 0 | 70 | 255 | 255 | 255 | 113 | 57 | 255 | 197 | 141 | 255 | 69 | 52 | 255 | 255 | 255 | 255 | 0 | 0 |
| 111 | 0 | 126 | 255 | 255 | 135 | 95 | 108 | 255 | 210 | 140 | 49 | 58 | 75 | 255 | 255 | 255 | 11 | 0 |
| 255 | 255 | 185 | 82 | 255 | 255 | 255 | 255 | 255 | 255 | 187 | 139 | 255 | 255 | 255 | 255 | 255 | 255 | 255 |
| 255 | 255 | 130 | 0 | 69 | 255 | 255 | 255 | 113 | 57 | 255 | 197 | 141 | 255 | 69 | 52 | 255 | 255 | 255 |
| 255 | 255 | 164 | 106 | 0 | 125 | 255 | 255 | 135 | 95 | 108 | 255 | 210 | 140 | 49 | 58 | 75 | 255 | 255 |
| 255 | 255 | 255 | 255 | 255 | 183 | 82 | 255 | 255 | 255 | 255 | 255 | 255 | 187 | 139 | 255 | 255 | 255 | 255 |
| 0 | 255 | 255 | 255 | 255 | 127 | 0 | 69 | 255 | 255 | 255 | 113 | 57 | 255 | 197 | 141 | 255 | 69 | 255 |
| 0 | 0 | 255 | 255 | 255 | 161 | 106 | 0 | 125 | 255 | 255 | 135 | 95 | 108 | 255 | 210 | 140 | 49 | 255 |
| 255 | 131 | 249 | 255 | 255 | 255 | 255 | 255 | 183 | 82 | 255 | 255 | 255 | 255 | 255 | 255 | 187 | 139 | 255 |
| 255 | 255 | 0 | 0 | 255 | 255 | 255 | 255 | 127 | 0 | 69 | 255 | 255 | 255 | 113 | 57 | 255 | 197 | 255 |
| 255 | 255 | 11 | 0 | 0 | 255 | 255 | 255 | 161 | 106 | 0 | 125 | 255 | 255 | 135 | 95 | 108 | 255 | 11 |
| 255 | 255 | 255 | 255 | 130 | 249 | 255 | 255 | 255 | 255 | 255 | 255 | 255 | 183 | 82 | 255 | 255 | 255 | 255 |
| 52 | 255 | 255 | 255 | 255 | 0 | 0 | 255 | 255 | 255 | 255 | 127 | 0 | 69 | 255 | 255 | 255 | 113 | 255 |
| 58 | 75 | 255 | 255 | 255 | 11 | 0 | 0 | 255 | 255 | 255 | 161 | 106 | 0 | 125 | 255 | 255 | 135 | 255 |
| 255 | 255 | 255 | 255 | 255 | 255 | 130 | 249 | 255 | 255 | 255 | 255 | 255 | 183 | 82 | 255 | 255 | 255 | 255 |
| 141 | 255 | 69 | 52 | 255 | 255 | 255 | 255 | 0 | 0 | 255 | 255 | 255 | 255 | 128 | 0 | 72 | 255 | 255 |
| 212 | 141 | 49 | 58 | 75 | 255 | 255 | 255 | 11 | 0 | 0 | 255 | 255 | 255 | 169 | 113 | 0 | 128 | — |

AVERAGE : 184

FIG.10

| 136 | 136 | 255 | 255 | 40 | 255 | 255 | 255 | 0 | 0 | 40 | 255 | 255 | 255 | 40 | 40 | 0 | 136 | 255 |
|---|---|---|---|---|---|---|---|---|---|---|---|---|---|---|---|---|---|---|
| 136 | 136 | 255 | 255 | 40 | 255 | 255 | 255 | 0 | 40 | 255 | 255 | 255 | 255 | 40 | 0 | 136 | 255 | 255 |
| 255 | 255 | 255 | 255 | 255 | 255 | 136 | 136 | 255 | 255 | 255 | 255 | 255 | 255 | 136 | 136 | 255 | 255 | 255 |
| 255 | 255 | 255 | 255 | 255 | 255 | 255 | 136 | 0 | 40 | 255 | 255 | 255 | 255 | 40 | 0 | 136 | 255 | 255 |
| 40 | 255 | 255 | 255 | 136 | 0 | 0 | 40 | 255 | 255 | 255 | 40 | 40 | 0 | 136 | 255 | 255 | 255 | 40 |
| 255 | 255 | 255 | 255 | 136 | 136 | 255 | 255 | 255 | 255 | 255 | 136 | 136 | 255 | 255 | 255 | 255 | 255 | 255 |
| 255 | 255 | 40 | 0 | 0 | 255 | 255 | 255 | 255 | 255 | 0 | 136 | 255 | 255 | 40 | 40 | 40 | 255 | 255 |
| 255 | 136 | 0 | 0 | 40 | 255 | 255 | 255 | 255 | 0 | 136 | 255 | 255 | 40 | 40 | 255 | 136 | 255 | 255 |
| 136 | 136 | 255 | 255 | 255 | 255 | 255 | 255 | 136 | 136 | 255 | 255 | 255 | 255 | 255 | 255 | 136 | 136 | 255 |
| 0 | 40 | 255 | 255 | 255 | 255 | 255 | 0 | 136 | 255 | 255 | 40 | 40 | 40 | 255 | 136 | 136 | 40 | 255 |
| 40 | 255 | 255 | 255 | 255 | 40 | 0 | 136 | 255 | 255 | 40 | 40 | 40 | 255 | 136 | 136 | 40 | 0 | 40 |
| 255 | 255 | 255 | 255 | 255 | 255 | 136 | 136 | 255 | 255 | 255 | 255 | 255 | 255 | 136 | 136 | 255 | 255 | 255 |
| 255 | 255 | 40 | 40 | 255 | 40 | 0 | 255 | 255 | 255 | 255 | 40 | 40 | 255 | 136 | 0 | 40 | 255 | 255 |
| 255 | 255 | 40 | 40 | 40 | 255 | 136 | 136 | 40 | 40 | 40 | 255 | 255 | 0 | 0 | 40 | 255 | 255 |  |
| 136 | 255 | 255 | 255 | 255 | 255 | 255 | 255 | 255 | 255 | 255 | 255 | 255 | 136 | 136 | 255 | 255 | 255 | 255 |
| 0 | 136 | 255 | 255 | 255 | 40 | 40 | 255 | 136 | 136 | 255 | 40 | 40 | 255 | 255 | 255 | 136 | 0 |  |
| 40 | 0 | 136 | 255 | 255 | 40 | 40 | 40 | 255 | 136 | 136 | 255 | 255 | 255 | 255 | 255 | 255 | 0 |  |
| 255 | 255 | 136 | 136 | 255 | 255 | 255 | 255 | 255 | 255 | 136 | 136 | 255 | 255 | 255 | 255 | 255 | 255 |  |
| 255 | 255 | 40 | 0 | 136 | 255 | 255 | 40 | 40 | 255 | 255 | 255 | 136 | 0 | 0 | 255 | 255 |  |  |
| 255 | 255 | 40 | 40 | 0 | 136 | 255 | 40 | 40 | 40 | 255 | 255 | 255 | 0 | 0 | 255 | 255 |  |  |

AVERAGE : 184

AVERAGE : 184

IMAGE PROCESSING APPARATUS, IMAGE PROCESSING METHOD, AND STORAGE MEDIUM

BACKGROUND OF THE INVENTION

Field of the Invention

The present invention relates to halftone processing.

Description of the Related Art

Image processing apparatuses that reproduce digital images using an electrophotographic process are widely used, such as laser beam printers. Such image processing apparatuses commonly employ, to reproduce the halftone of images, a method of reproducing the gradation by modulating the sizes of areas where coloring materials adhere (what is called the halftone dot size) using halftone processing of a dot concentration type (hereinafter referred to as an AM screen processing). The AM screen processing provides good halftone processing result in the electrophotographic process because the AM screen processing forms halftone dots of the same shape at the same intervals on flat portions of an image.

However, in the AM screen processing, interference occurs between the AM screen and high-frequency components included in an image, in areas including a lot of high-frequency components, such as images having a periodic pattern or portions including characters and thin lines. In particular, in a case where periodic patterns having a cycle close to the cycle of the AM screen are inputted, strong interference occurs, and as a result, periodic stripe patterns called moire occur.

To suppress such moire, there is a known method in which a low-pass filter (hereinafter abbreviated as an LPF) is applied to an input image to remove high-frequency components, which cause moire, before the AM screen processing. However, in a case where a low-pass filter sufficient enough to remove high-frequency components, which cause moire, is applied to an input image, edge portions of the image are blunted, and the sharpness of the image deteriorates.

In light of the above, Japanese Patent Laid-Open No. 2016-136374 proposes the following method to provide halftone processing result with favorable sharpness while reducing moire.

In the method described in Japanese Patent Laid-Open No. 2016-136374, first, a LPF is applied to an input image to obtain a low-frequency component image by removing high-frequency components, which cause moire, and AM screen processing is performed on the resultant low-frequency component image. In addition, the AM screen processing is performed on the input image, and a high-pass filter (hereinafter abbreviated as an HPF) is applied to the resultant image to generate a high-frequency component image in which low-frequency components have been removed. Then, the two images, the low-frequency component image subjected to the AM screen processing and the high-frequency component image, are added to generate an output image. With these processes, the method is aimed to provide halftone processing result with favorable sharpness while suppressing moire caused by the AM screen processing.

However, in the method described in Japanese Patent Laid-Open No. 2016-136374, the high-frequency component image generated from the image subjected to the AM screen processing may already have harmonic components of halftone dots or interference between the AM screen and high-frequency components included in the image. In such a case, it is impossible to appropriately extract high-frequency components of the input image. For this reason, there is a possibility that even though the extracted high-frequency components are added to the low-frequency component image, the high-frequency components of the input image cannot be favorably compensated.

The present invention has been made in view of such a problem, an object thereof is to provide halftone processing result with good reproducibility of high-frequency components in an input image while suppressing interference between the AM screen and the high-frequency components included in the input image.

SUMMARY OF THE INVENTION

An image processing apparatus according to an embodiment of the present invention includes: a first generation unit that generates a low-frequency image by extracting a low-frequency component from an input image; a second generation unit that generates a high-frequency image by extracting a high-frequency component from the input image; a screen processing unit that generates an AM screen image by performing AM screen processing on the low-frequency image; an addition processing unit that generates an added image by adding the high-frequency image to the AM screen image; and a correction unit that corrects the added image. The added image is an image in which a pixel value out of a specified gradation range was replaced with a pixel value within the specified gradation range as a result of adding the high-frequency image to the AM screen image. The correction unit distributes a difference between the pixel value before the replacement and the pixel value after the replacement occurred in the pixel the pixel value of which was replaced with the pixel value within the specified gradation range, to pixels other than the pixels the pixel value of which was replaced with the pixel value within the specified gradation range.

Further features of the present invention will become apparent from the following description of exemplary embodiments with reference to the attached drawings.

BRIEF DESCRIPTION OF THE DRAWINGS

FIG. 4 is a diagram showing an example of a filter in LPF processing in the first embodiment;

FIGS. 5A to 5C are diagrams showing an example of result of the LPF processing and HPF processing in the first embodiment;

FIG. 6 is a diagram showing an example of a matrix table which is a dither matrix in the first embodiment;

FIGS. 7A and 7B are diagrams showing an example of the difference in screen processing results in the first embodiment depending on whether high-frequency components exist;

FIG. 8A is a diagram showing an added image obtained by adding an image subjected to the screen processing of low-frequency components and a high-frequency component image in the first embodiment;

FIG. 8B is a diagram showing an image obtained by performing clip processing on the added image in the first embodiment;

FIG. 10 is an example showing result of the gradation limiting processing in the first embodiment;

FIG. 13 is an example showing result of the gradation limiting processing in the second embodiment;

FIGS. 16A and 16B show an example showing result of the gradation limiting processing according to the third embodiment.

DESCRIPTION OF THE EMBODIMENTS

Hereinafter, embodiments of the present invention will be described in detail with reference to the drawings.

First Embodiment (Occurrence of Moire and Suppression Thereof)

Figure 1:
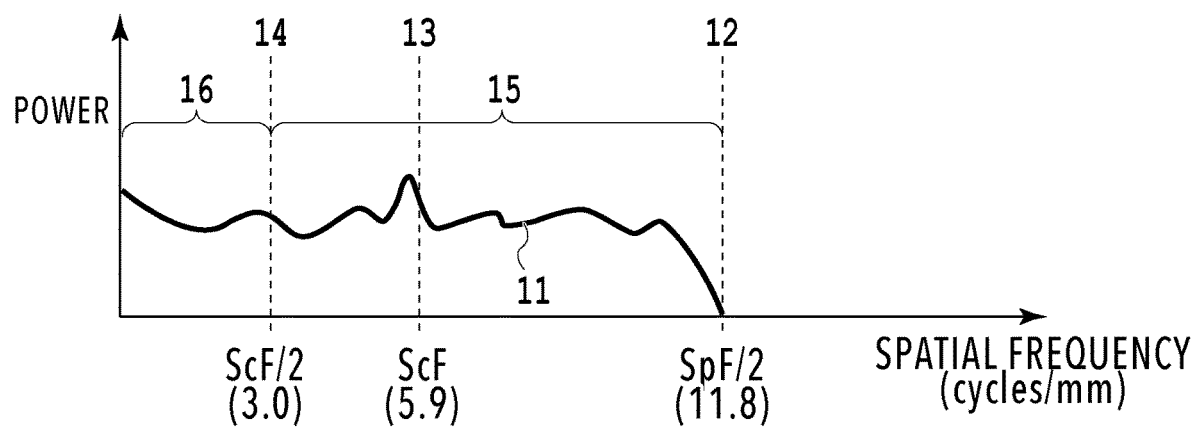
FIG. 1 is a diagram for explaining the relationship between moire and the spatial frequency of an AM screen and an image.

First, with reference to FIG. 1, description will be provided for the relationship between moire and the spatial frequency of an AM screen and an image. The horizontal axis of the graph shown in FIG. 1 represents the spatial frequency, and the vertical axis represents the intensity (power) of the frequency component in the image. Note that in FIG. 1, the sampling frequency (in other words, image resolution) of an input image is abbreviated as "SpF", and the frequency of the AM screen (in other words, the number of screen lines) is abbreviated as "ScF".

In addition, in FIG. 1, reference numeral 11 indicates the intensity distribution of frequency components of the input image, reference numeral 12 indicates pixels having a spatial frequency of SpF/2, which is half of the sampling frequency of the input image, and reference numeral 13 indicates pixels having the frequency of the AM screen (ScF). Reference numeral 14 indicates pixels having a spatial frequency of ScF/2, which is half of the frequency of the AM screen. Note that in this embodiment, the sampling frequency (SpF) of the input image is 23.6 cycles/mm (image resolution 600 dpi), and the frequency of the AM screen (ScF) is 5.9 cycles/mm (the number of screen lines is 150 lpi).

AM screen processing is a technique to reproduce gradation by changing the sizes of halftone dots arranged at equal intervals. In the AM screen processing, the resolution of actual gradation reproduction is resampled from the sampling frequency (SpF) of an input image to the frequency of the AM screen (ScP). At this time, of the frequency components 11 of the input image, the components corresponding to the high frequency band 15 exceeding ScF/2 (high-frequency components) interfere with the AM screen, and causes aliasing moire in the low frequency band 16 (Nyquist theorem).

In this embodiment, after the high-frequency components that cause such moire are removed, the image is subjected to the AM screen processing, and then the resultant image is appropriately combined with the high-frequency components. This process makes it possible to obtain halftone processing result with suppressed moire and good reproducibility of high-frequency components (in other words, sharpness).

Figure 2:
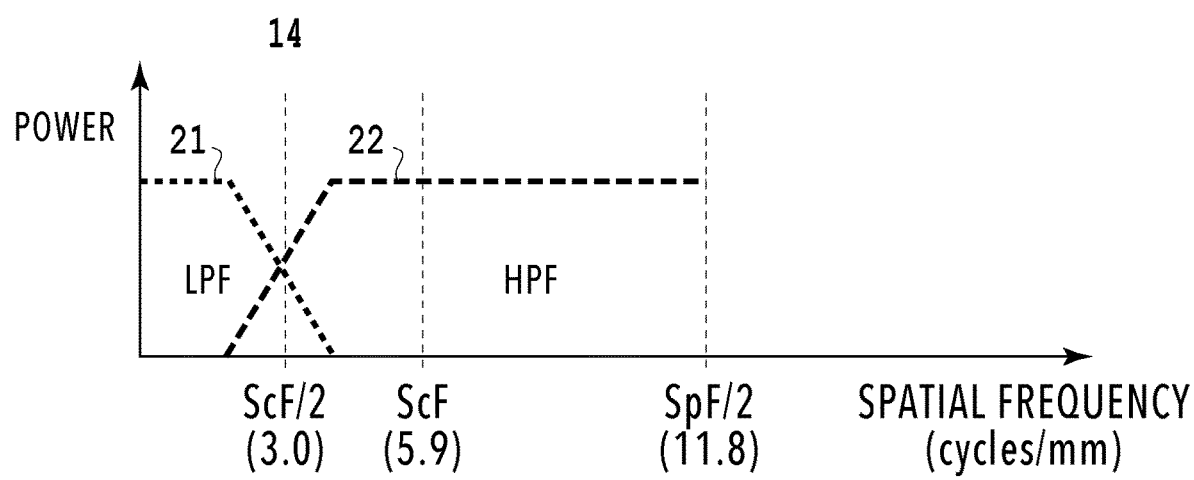
FIG. 2 is a diagram for explaining the frequency characteristics of a LPF and a HPF.

FIG. 2 is a diagram for explaining the frequency characteristics of a LPF and a HPF used in this embodiment. In the graph in FIG. 2, the horizontal axis represents the spatial frequency, and the vertical axis represents the intensity (power) of the frequency component. In FIG. 2, in the same way as in FIG. 1, the sampling frequency of the input image is abbreviated as SpF, and the frequency of the AM screen is abbreviated as ScF. Reference numeral 14 indicates ScF/2 as in FIG. 1. Reference numeral 21 indicates the frequency characteristics of the LPF, and reference numeral 22 indicates the frequency characteristics of the HPF.

As described with reference to FIG. 1, moire is caused by the frequency components higher than or equal to ScF/2. Thus, processing the input image using a LPF with the frequency characteristics 21 having a cutoff frequency at around ScF/2 provides a low-frequency component image (also referred to as a low-frequency image) in which causal parts for moire are removed. In other words, the cutoff frequency needs to be half the AM screen frequency or less. Thus, AM screen processing on the resultant low-frequency image does not cause moire, but the image has low sharpness because the high-frequency components have been lost. Meanwhile, in a case where a HPF with the frequency characteristics 22 having a cutoff frequency at around ScF/2 is applied to the input image before the input image is subjected to the AM screen processing, it is possible to obtain a high-frequency component image (also referred to as a high-frequency image) including high-frequency components appropriately extracted from the input image. In view of the above, in this embodiment, the image obtained by subjecting the low-frequency component image extracted from the input image to the AM screen processing and the high-frequency component image extracted from the input image not subjected to the AM screen are combined to obtain a halftone image having all frequencies.

[Configuration of Apparatus]

Figure 3:
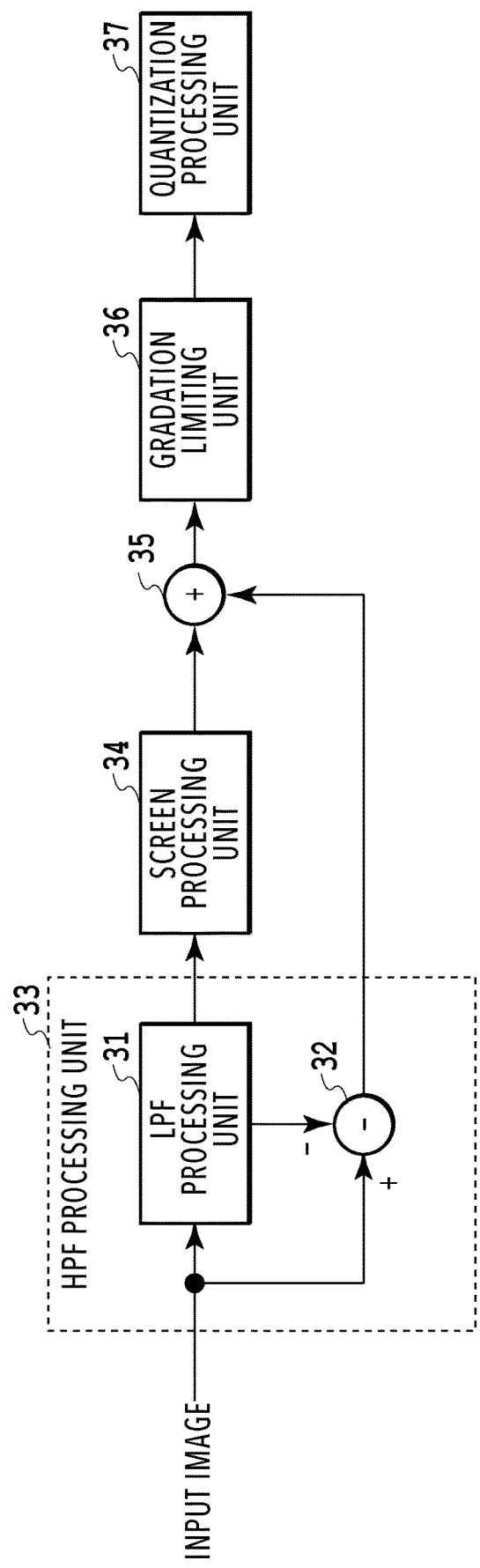
FIG. 3 is a block diagram showing a configuration example of an image processing apparatus that performs halftone processing according to a first embodiment.

FIG. 3 shows a configuration example of an image processing apparatus that performs halftone processing according to this embodiment.

In FIG. 3, a LPF processing unit 31 extracts low-frequency components lower than a specified cutoff frequency from an input image to generate a low-frequency component image.

A HPF processing unit 33 extracts high-frequency components higher than a specified cutoff frequency from the input image to generate a high-frequency component image. For the HPF processing unit 33, a common HPF may simply be used; however, in this embodiment, the HPF processing unit 33 includes a combination of the LPF processing unit 31 and a subtraction processing unit 32. This configuration makes it possible to easily match the cutoff frequency of the LPF processing unit 31 and the cutoff frequency of the HPF processing unit 33 to each other.

A screen processing unit 34 performs AM screen processing on the low-frequency component image outputted by the LPF processing unit 31 to generate an AM screen image. An addition processing unit 35 generates an image (added image) in which the AM screen image outputted by the screen processing unit 34 and the high-frequency component image outputted by the HPF processing unit 33 are added together.

A gradation limiting unit 36 performs clip processing to limit pixel values in the added image generated by the addition processing unit 35 within a specified gradation range. Specifically, the gradation limiting unit 36 generates an added image in which for the pixels having pixel values outside the specified gradation range as a result of adding the high-frequency image to the AM screen image, the pixel values have been replaced with pixel values within the specified gradation range. Here, since ordinary clip processing causes density change (clip error) because of gradation errors, the gradation limiting unit 36 in this embodiment performs processing in which the clip error is suppressed by weighting the clip error of a pixel of interest and diffusing the weighted clip error to peripheral pixels. In other words, the gradation limiting unit 36 also functions as correction means for correcting pixel values of peripheral pixels of the pixel of interest in the added image. Processing performed by the gradation limiting unit 36 will be described in detail later.

A quantization processing unit 37 converts 8-bit (256 gradations) image data into image data having the number of gradations that can be outputted by the image processing apparatus. For example, the image formation apparatus forms one pixel divided into 15 parts by controlling the emission of laser light by PWM modulation and is capable of expressing 16 gradations per pixel. In this case, each pixel having 8-bit (256 gradations) image data is quantized to 4 bits (16 levels) by the quantization processing unit 37. For example, the quantization processing unit 37 performs quantization by truncating 4 bits from (dividing by 16) the 8-bit (256 gradation) image data.

[Details of Configuration of Apparatus]

Hereinafter, details of the configuration of the image processing apparatus according to this embodiment will be described.

LPF Processing and HPF Processing (Filter Size)

Here, the filter size of LPF processing will be specifically described. As described with reference to FIG. 2, a filter with a size having a cutoff frequency at around ScF/2 is used to remove high-frequency components that cause moire. As shown in FIG. 2, in this embodiment, ScF/2 is 3.0 cycles/mm. Such a filter removes frequency components higher than or equal to 1/(3.0 cycles/mm×0.042 mm/pixel)=7.9 pixels/cycle. In other words, in a case where an averaging filter has a size of around 8×8, a cutoff frequency is around ScF/2. In this embodiment, an averaging filter with a size of 9×9, in which the size of one side is an odd number, is used so as to refer to the same distance from a pixel of interest in the upper, lower, right, and left directions.

FIG. 4 shows an example of a filter in the LPF processing in this embodiment. FIG. 4 shows an averaging filter with a size of 9×9. According to the shown filter, the filtering output of a target pixel is calculated by multiplying the magnification for each pixel by the pixel value of the corresponding pixel and then dividing the sum of the resultant values by 81. Note that in the case of using a Gaussian filter, since the center is averaged in a weighting manner, a filter with a size of 13×13, which is 1.5 times the pixel range of the averaging filter, is necessary.

Meanwhile, the frequency components causing moire are different depending on the frequency of the AM screen (the number of screen lines). For example, in a case where the number of AM screen lines is 200 lpi (ScF=7.9 cycles/mm), moire is caused by frequency components higher than or equal to 3.9 cycles/mm (ScF/2). The filter that removes these frequency components is a filter that remove the frequency components higher than or equal to 1/(3.9 cycles/mm×0.042 mm/pixel)=6.0 pixels/cycle. In other words, in a case where a filter has a size of about 6×6, the cutoff frequency can be made close to ScF/2. It is desirable that the gradations of the frequency components that do not cause moire be reproduced by the AM screen. Thus, it is more effective to make the filter size variable depending on the frequency of the AM screen used in the screen processing unit 34 so that the frequency components that do not cause moire are not removed excessively.

(HPF Processing)

In this embodiment, the high-frequency component image including the high-frequency components higher than a specified cutoff frequency is generated by subtracting from the input image the low-frequency component image generated at the LPF processing unit 31.

Figure 5A:
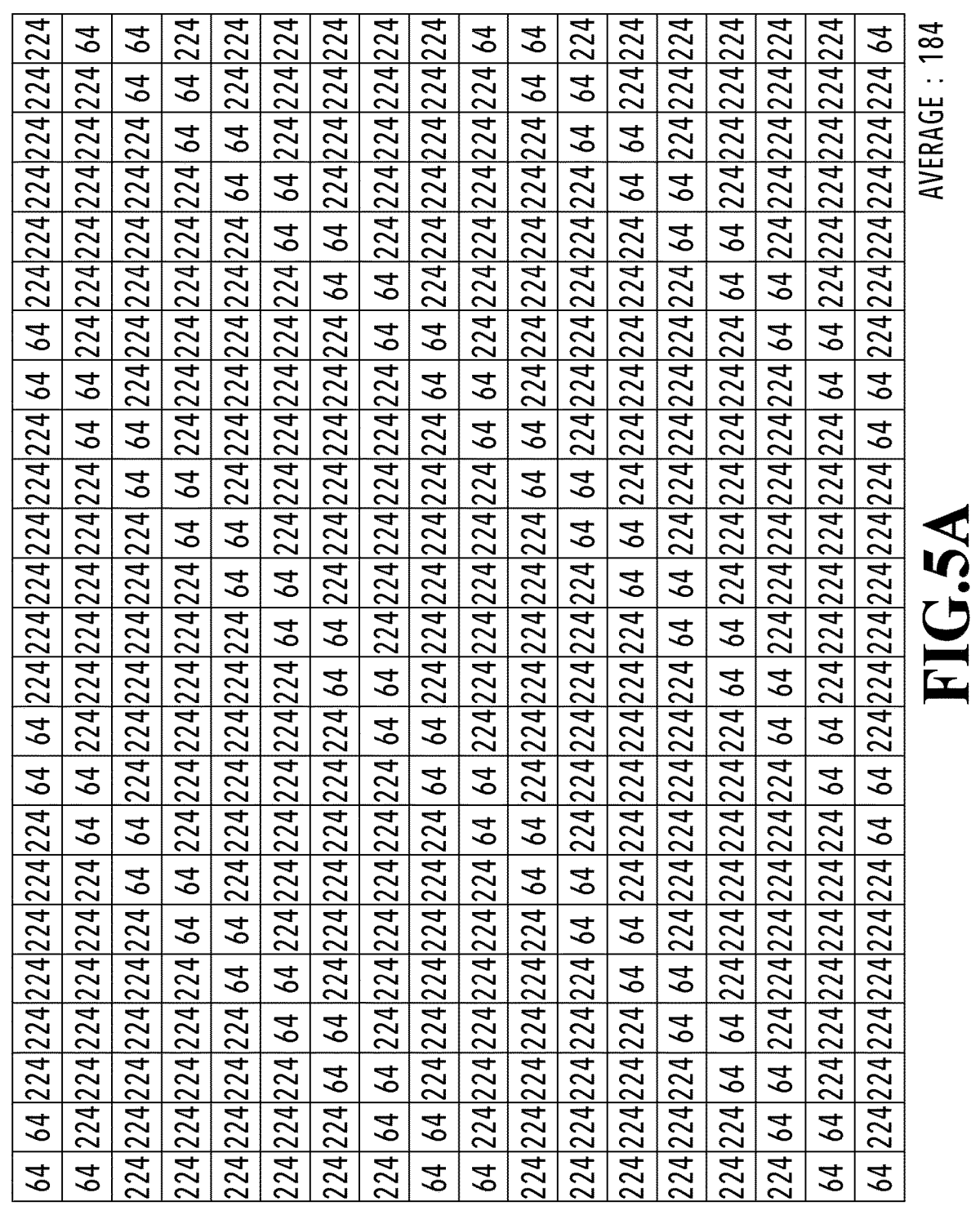
Figure 5B:
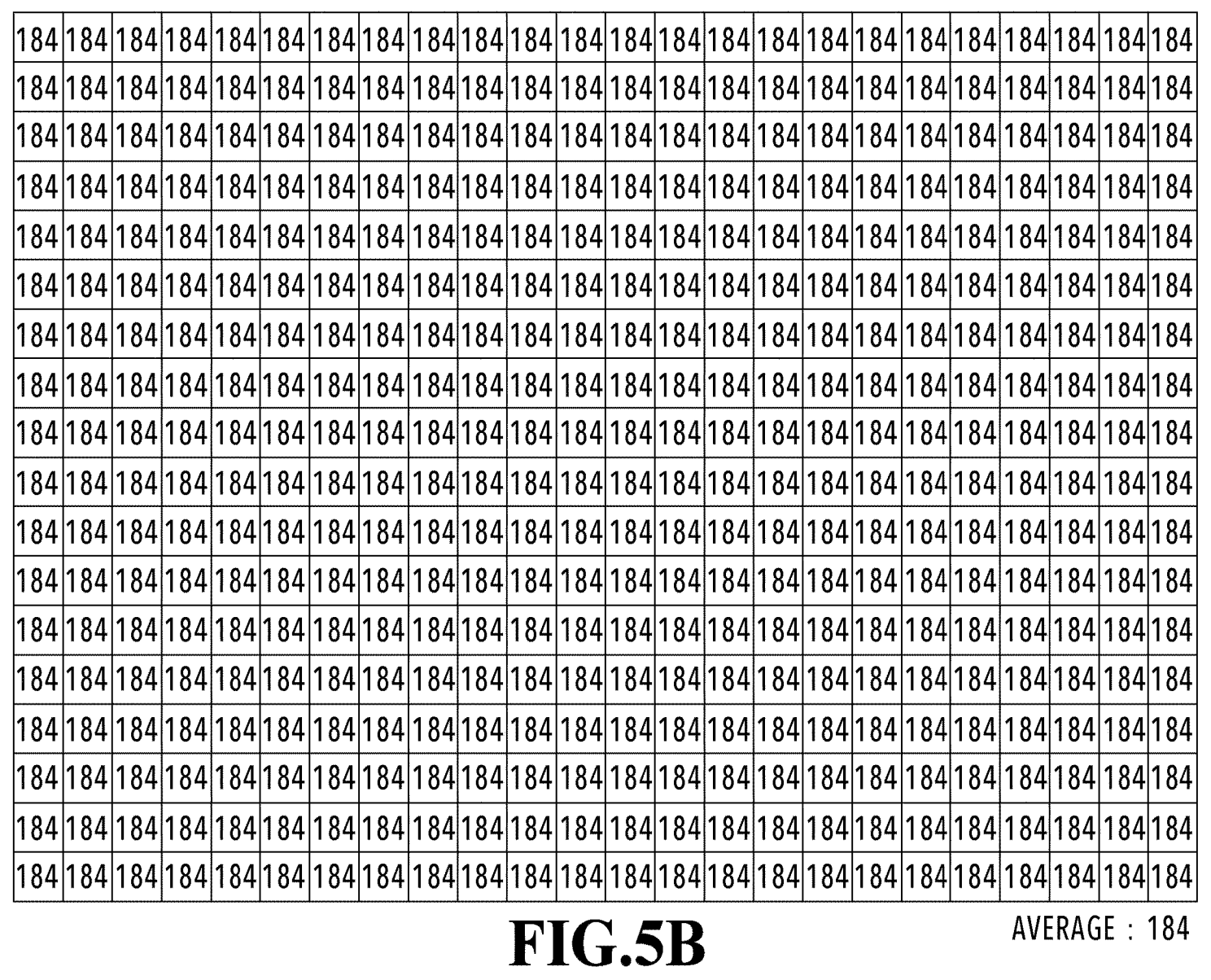
Figure 5C:
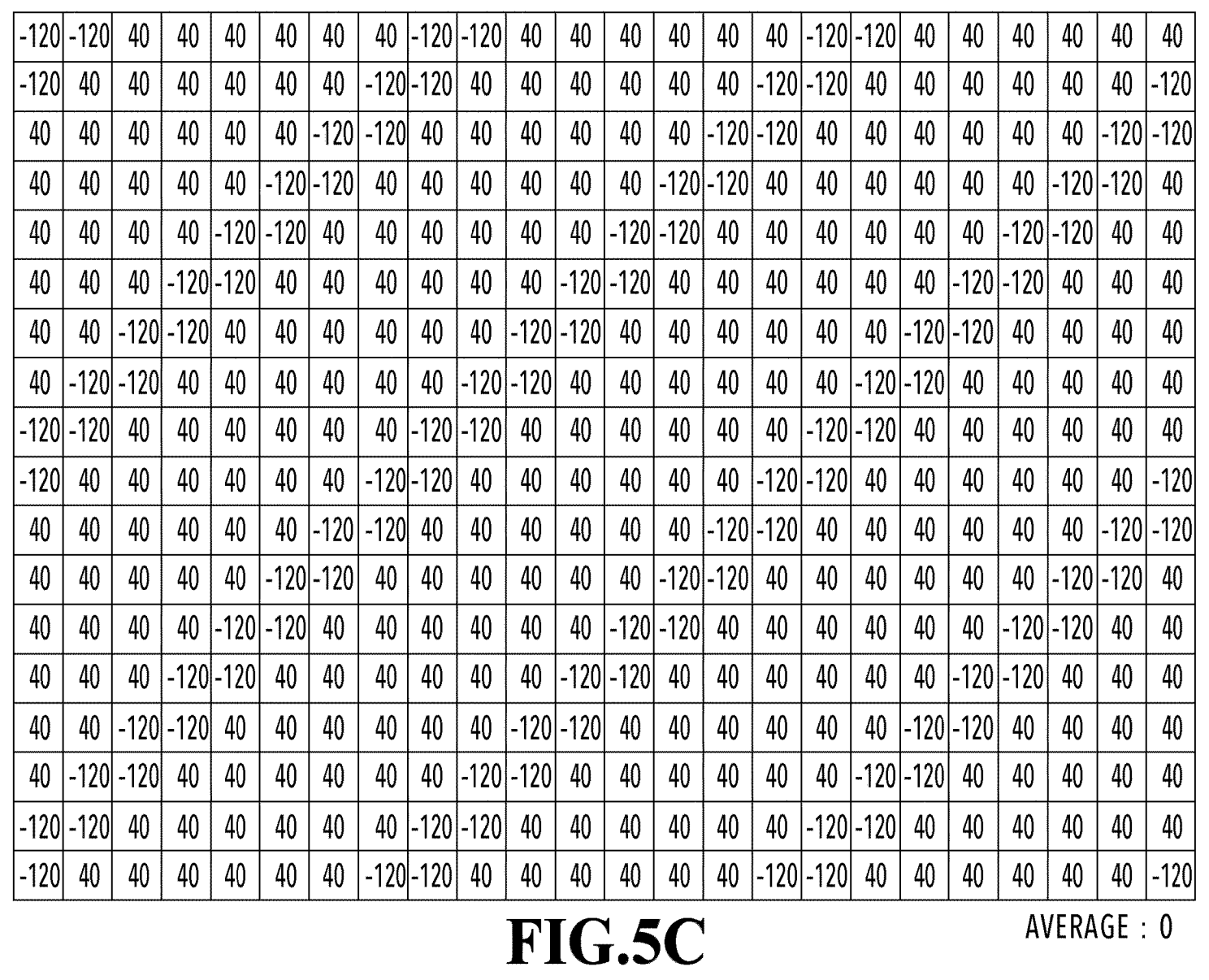

FIGS. 5A to 5C are diagrams showing an example of result of the LPF processing and HPF processing in this embodiment. FIG. 5A shows an example of input image data. FIG. 5B shows an example of low-frequency component image data obtained by performing the LPF processing on the input image data. In other words, the processing result shown in FIG. 5B is obtained by performing the LPF processing on the input image data shown in FIG. 5A. FIG. 5C shows an example of high-frequency component image data obtained by performing the HPF processing on the input image data. In other words, subtracting the low-frequency component image data shown in FIG. 5B from the input image data shown in FIG. 5A provides the processing result shown in FIG. 5C.

Screen Processing

Figure 6:
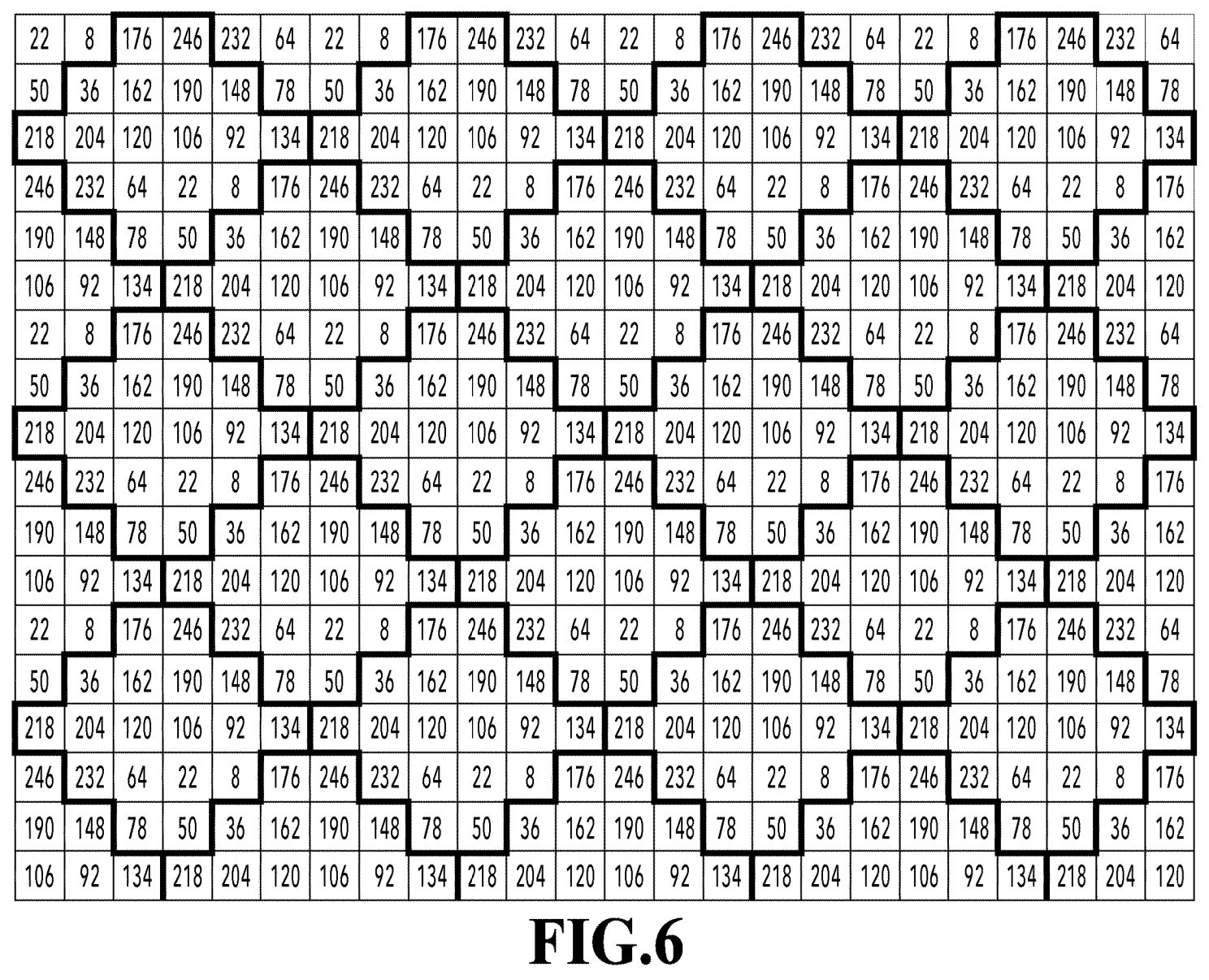

FIG. 6 shows an example of a matrix table which is a dither matrix used by the screen processing unit 34 in the first embodiment. In the matrix table shown in FIG. 6, each rectangle corresponds to a pixel, and the value in the rectangle is a threshold.

In this embodiment, the input gradation range has 256 values from the minimum value 0 to the maximum value 255, and the output has two values of the minimum value 0 and the maximum value 255. Specifically, in a case where a value of the image data inputted into the dither matrix is larger than or equal to 0 and smaller than the threshold, the output value is 0. In a case where the value of the image data is larger than or equal to the threshold, the output value is 255. The dither matrix in this embodiment has shapes, each having 18 pixels and depicted by thick lines in FIG. 6, and is capable of expressing 19 level gradation as area gradation.

Figure 7A:
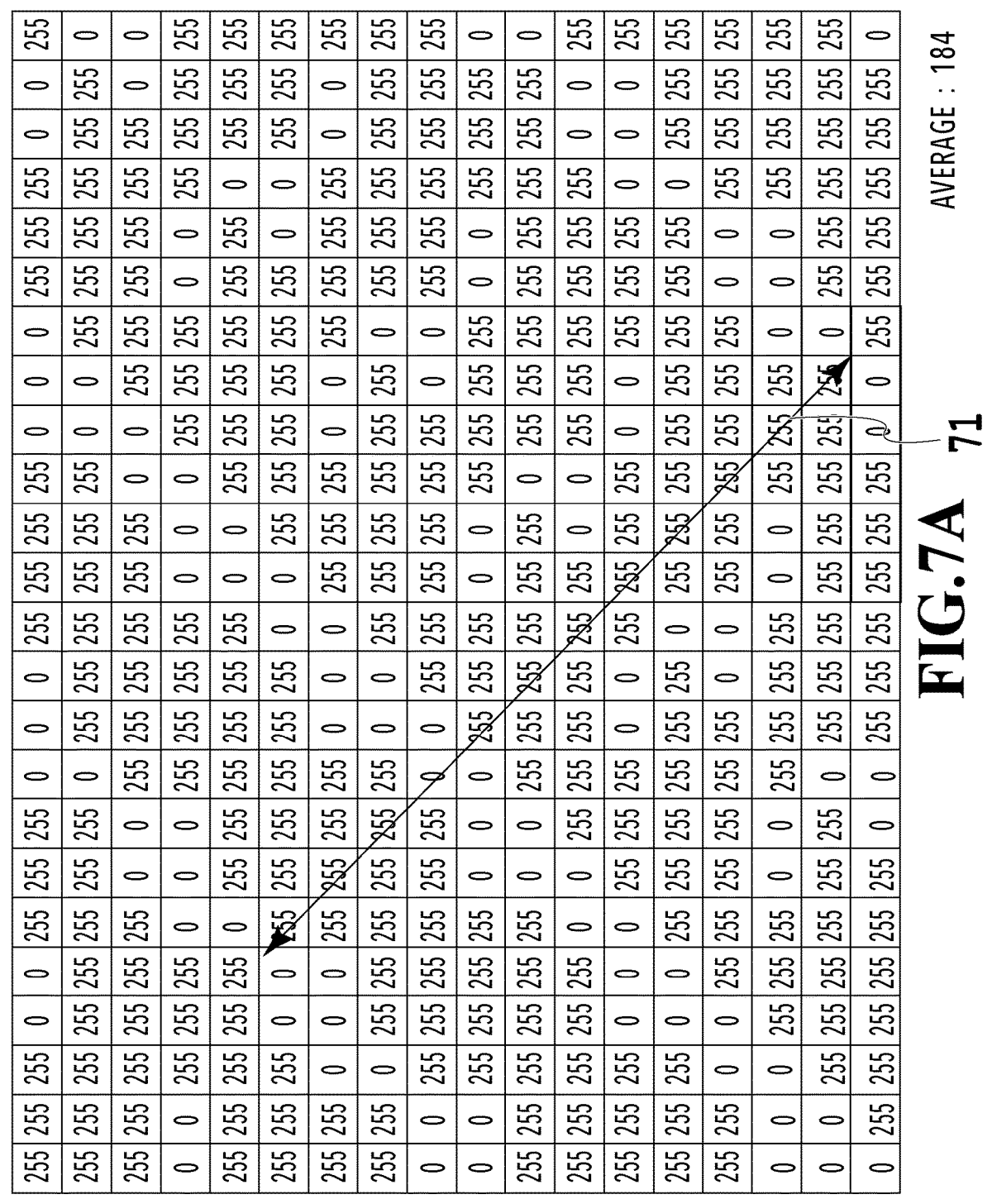
Figure 7B:
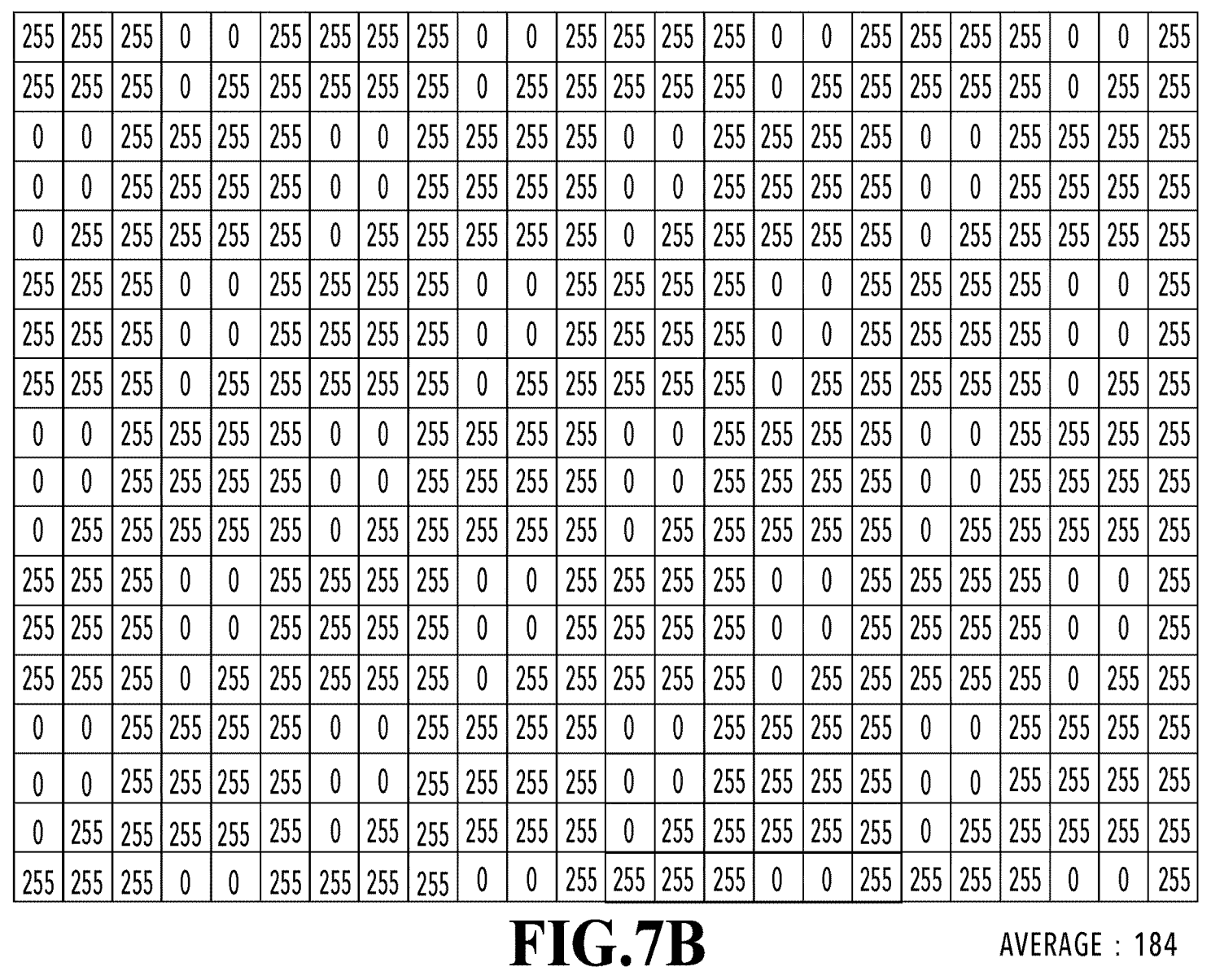

FIGS. 7A and 7B are diagrams showing an example of the difference in screen processing results depending on whether high-frequency components exist in the first embodiment. Here, with reference to FIGS. 7A and 7B, description will be provided for the difference in screen processing results depending on whether high-frequency components exist—in other words, whether the LPF processing is applied or not.

FIG. 7A shows image data obtained by performing the AM screen processing on the input image data shown in FIG. 5A. In other words, FIG. 7A shows processing result obtained by performing the AM screen processing without removing the high-frequency components that cause moire. In the image data in FIG. 7A, there is long cycle unevenness (in other words, moire) caused by interference with the AM screen. The arrow 71 indicates a one cycle range of the unevenness pattern that occurs periodically.

On the other hand, FIG. 7B shows image data obtained by performing the AM screen processing on the low-frequency component image data subjected to the LPF processing, shown in FIG. 5B. In other words, FIG. 7B shows processing result obtained by performing the AM screen processing after removing the high-frequency components that cause moire. In the image data in FIG. 7B, there is not moire caused by interference with the AM screen frequency.

Gradation Limiting Processing
(Occurrence of Clip Error)

Figure 8A:
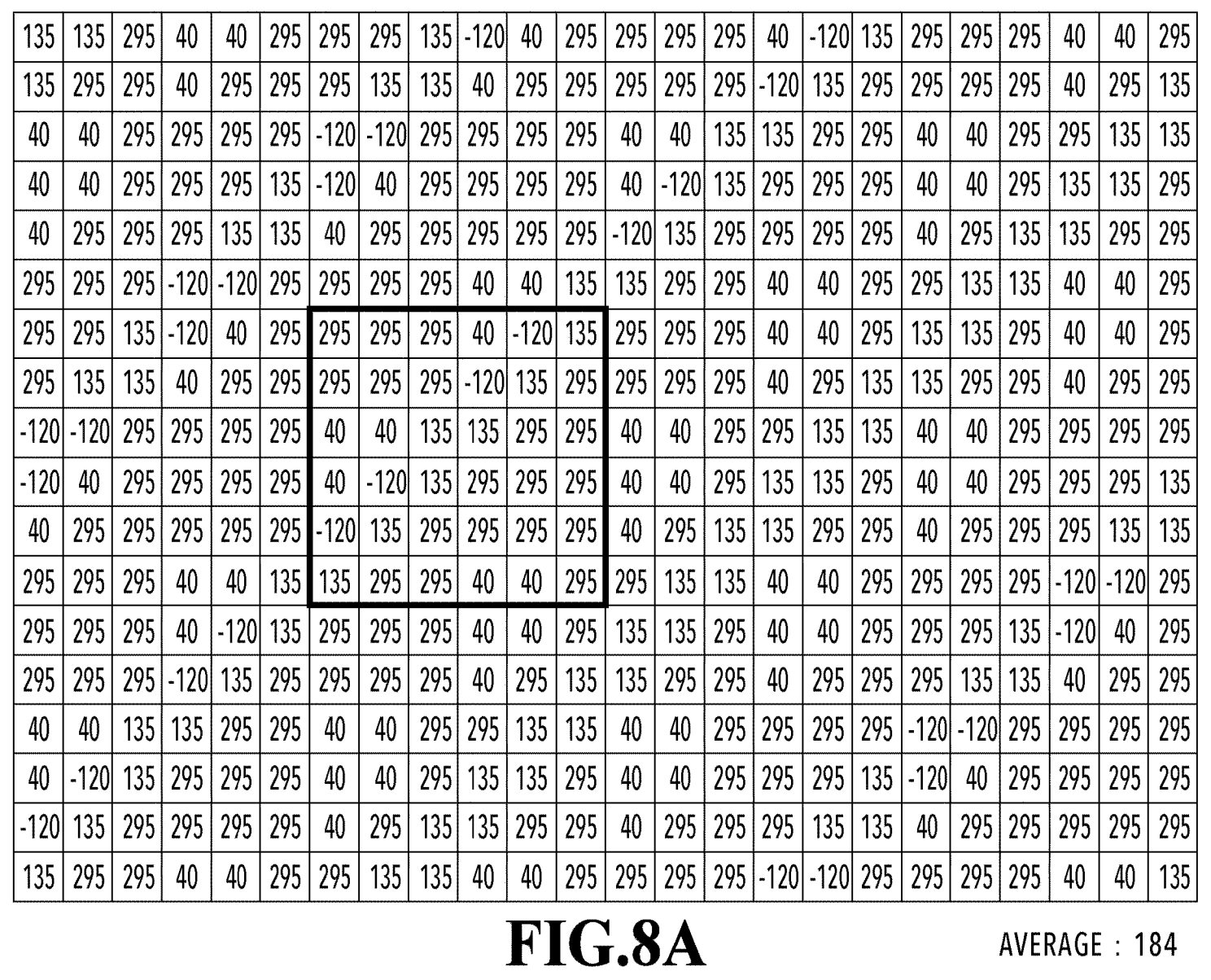
Figure 8B:
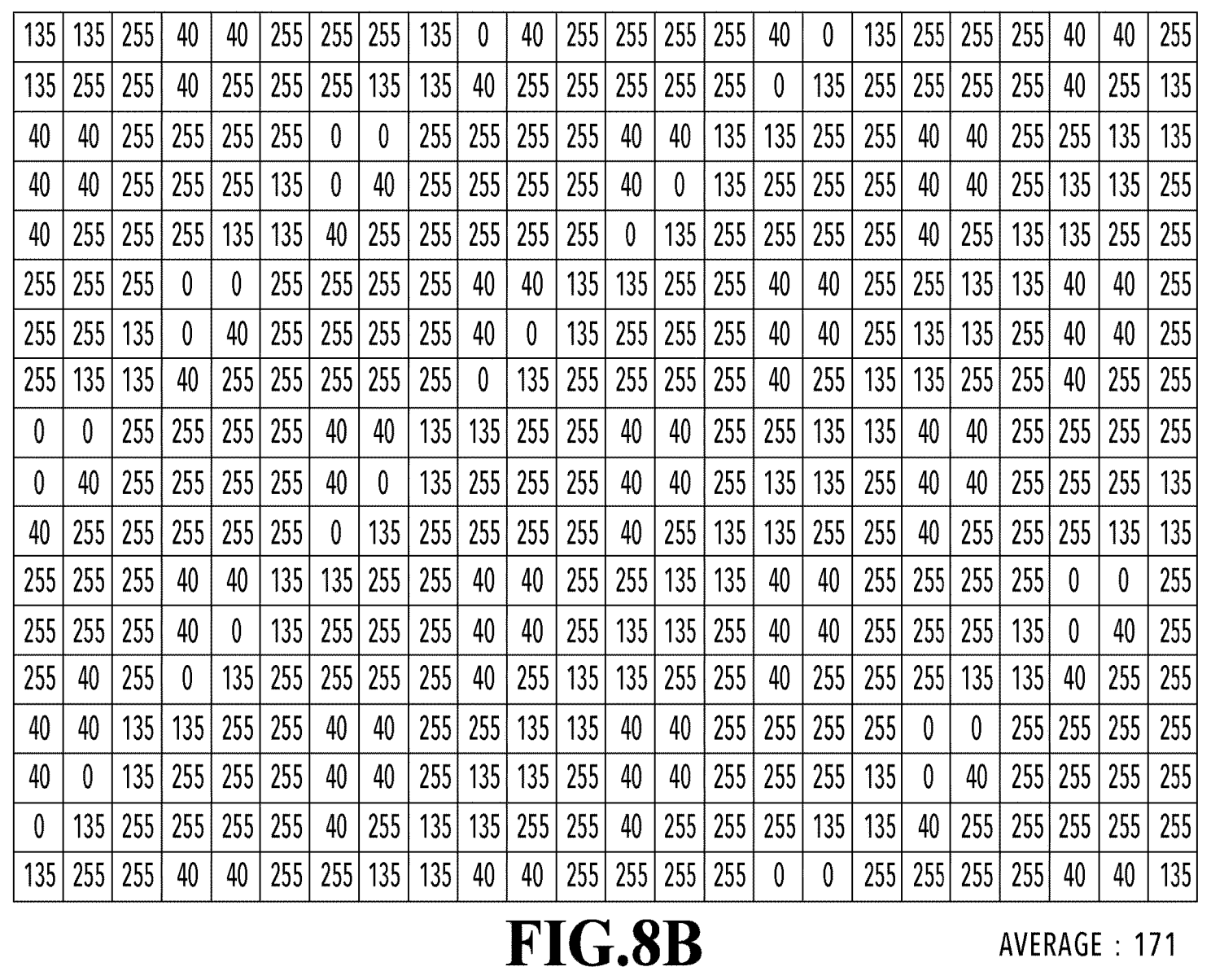

FIG. 8A shows an added image obtained by adding a screen processing image on low-frequency components and a high-frequency component image together, and FIG. 8B shows an image obtained by performing clip processing on the added image. Hereinafter, with reference to FIGS. 8A and 8B, description will be provided for addition of an image obtained by performing the AM screen processing on low-frequency components and a high-frequency component image as well as density change caused by clip processing.

FIG. 8A shows image data obtained by adding the high-frequency component image data shown in FIG. 5C to the low-frequency component image data subjected to the AM screen processing, shown in FIG. 7B. Because these two images do not have moire, the combined image does not have moire, either. In addition, because the average value of the low-frequency component image data subjected to the AM screen processing, shown in FIG. 7B, is 184 and the average value of the high-frequency component image data shown in FIG. 5C is 0, the average value of the image data after addition is 184. In other words, since the average value of the image data has not been changed, density change has not occurred, either.

FIG. 8B shows an example of image data obtained by performing the clip processing on the image data in FIG. 8A into a common 8-bit gradation range (limit the values larger than 255 to 255, and the values smaller than 0 to 0). The average value of the image data shown in FIG. 8B is 171, which is lower than the average value 184 of the image data shown in FIG. 8A before the clip processing. In other words, since the average value has changed, density change has occurred from the image data shown in FIG. 8A.

The density change described above occurs because the added gradation values are truncated by the clip processing. In this embodiment, errors (clip errors) caused by the truncation at the clip processing are diffused to peripheral pixels to suppress the occurrence of the density change while keeping the reproducibility of high-frequency components.

(Gradation Limiting Processing)

Figure 9:
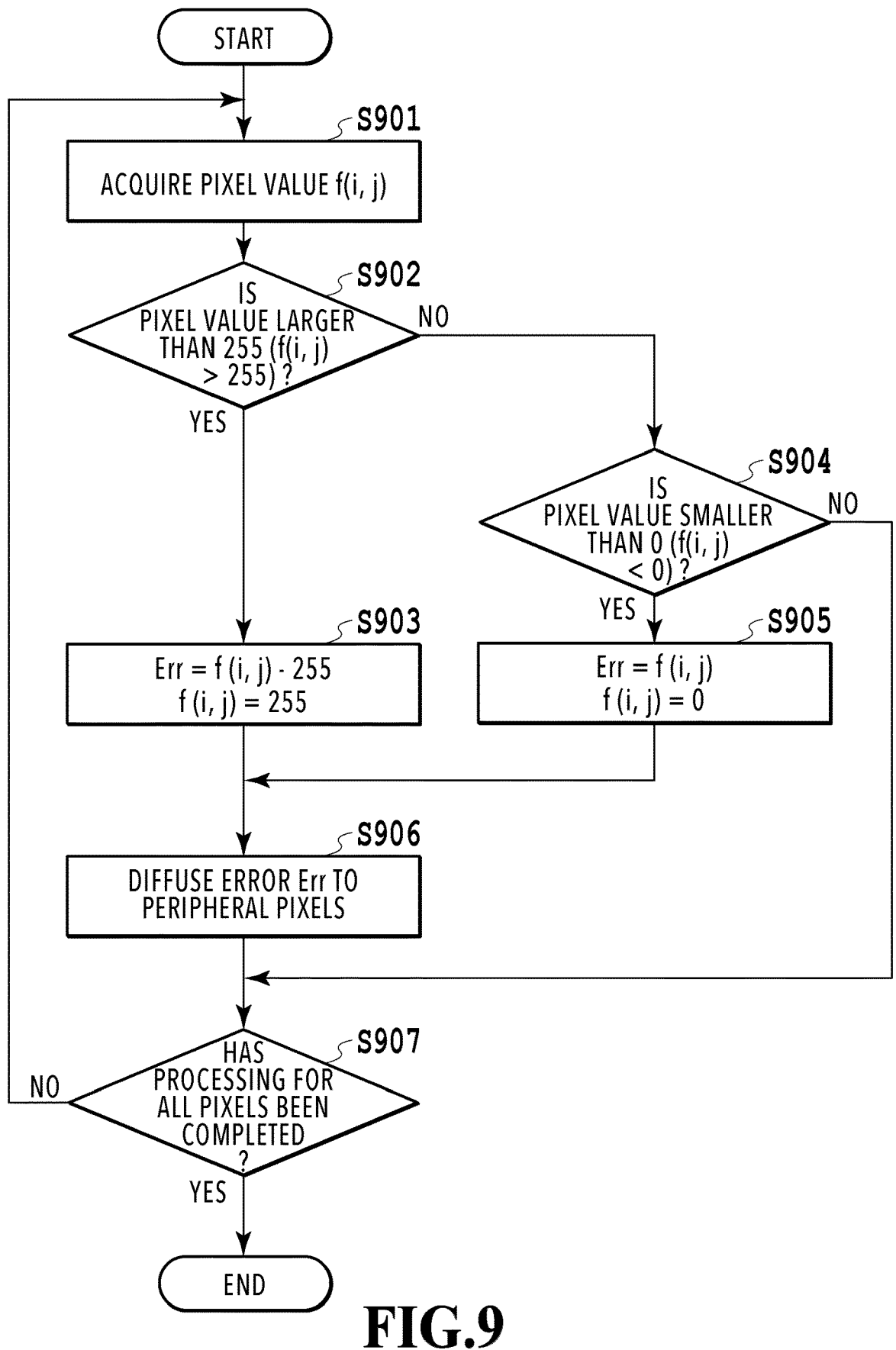
FIG. 9 is a flowchart of gradation limiting processing in the first embodiment.

FIG. 9 is a flowchart showing gradation limiting processing performed by the gradation limiting unit 36 in this embodiment. The gradation limiting unit 36 performs the gradation limiting processing while reading out pixels forming image data.

First, at step S901, the pixel value f(i, j) of a pixel (i, j) of interest in the image data subjected to the addition processing at the addition processing unit 35 is acquired. Then, at step S902, it is determined whether the acquired pixel value f(i, j) is larger than 255. In a case where the pixel value f(i, j) is larger than 255, the process proceeds to step S903. On the other hand, in a case where the pixel value f(i, j) is smaller than or equal to 255, the process proceeds to step S904.

At step S903, the clip error (f(i, j)−255) is stored in an error register Err, and the pixel value f(i, j) is clipped to 255.

At step S904, it is determined whether the acquired pixel value f(i, j) is smaller than 0. In a case where the pixel value f(i, j) is smaller than 0, the process proceeds to step S905. On the other hand, in a case where the pixel value f(i, j) is larger than or equal to 0, the process proceeds to step S907. Note that the case of proceeding to step S907 means the case where the pixel value f(i, j) is smaller than or equal to 255 and larger than or equal to 0, in other words, the case where the pixel value f(i, j) is within the gradation range.

At step S905, the clip error (f(i, j)−0) is stored in the error register Err, and the pixel value f(i, j) is clipped to 0.

At step S906, the clip error stored in the error register Err is diffused to the right pixel(i, j+1), lower-left pixel(i+1, j−1), lower pixel(i+1, j), and lower-right pixel(i+1, j+1) of the pixel-of-interest(i, j) as follows. In other words, the pixel values of peripheral pixels of the pixel of interest are corrected.

$$f(i, j+1) = f(i, j+1) + Err \times \alpha \quad (1)$$

$$f(i+1, j-1) = f(i+1, j-1) + Err \times \alpha \quad (2)$$

$$f(i+1, j) = f(i+1, j) + Err \times \alpha \quad (3)$$

$$f(i+1, j+1) = f(i+1, j+1) + Err \times \alpha \quad (4)$$

Here, the coefficient $\alpha$ is a rate (error diffusion coefficient) at which the error that has occurred in the pixel of interest is diffused to another pixel (error diffusion pixel). In other words, the coefficient $\alpha$ is a weighting coefficient. In this embodiment, $\{\alpha(1), \ldots, \alpha(4)\} = \{7, 3, 5, 1\}/16$. Note that the error diffusion pixels and the error diffusion coefficients are not limited to these.

At step S907, it is determined whether the processing for all the pixels has been completed. If it is determined that the processing has not been completed, the pixel of interest is moved to the right by one pixel, and steps S902 to S906 are repeated. Note that in a case where the pixel of interest has reached the right end, the pixel of interest is switched to the left end of the next line below. If it is determined that the processing for all the pixels has been completed, the process ends.

FIG. 10 shows image data obtained by performing the gradation limiting processing in this embodiment on the image data shown in FIG. 8A in which the high-frequency components have been added to the low-frequency component image data subjected to the AM screen processing. The average value of the image data shown in FIG. 10 is 184, which is equal to the average value 184 of the image data before the clip processing. In other words, the gradation limiting processing in this embodiment can suppress the density change.

As described above, this embodiment provides halftone processing result in which the interference between the AM screen and high-frequency components included in an input image is suppressed. In addition, this embodiment suppresses the occurrence of density change by diffusing errors (clip errors) caused by truncation in the clip processing to peripheral pixels. Since the clip error of a pixel of interest is reproduced using neighboring pixels, it is possible to keep the reproducibility of the high-frequency components.

Second Embodiment

In the first embodiment, description was provided for the method of suppressing the occurrence of density change by diffusing the clip error that has occurred at a pixel of interest to neighboring pixels. In the second embodiment, description will be provided for a method of cancelling the clip error by distributing the clip error for each block area including a plurality of pixels. Specifically, in this embodiment, description will be provided for a method of diffusing the clip error by calculating the total value of clip errors for each block and determining pixels to which the clip errors are to be distributed and amounts of the distributions based on the high-frequency component image.

Figure 11:
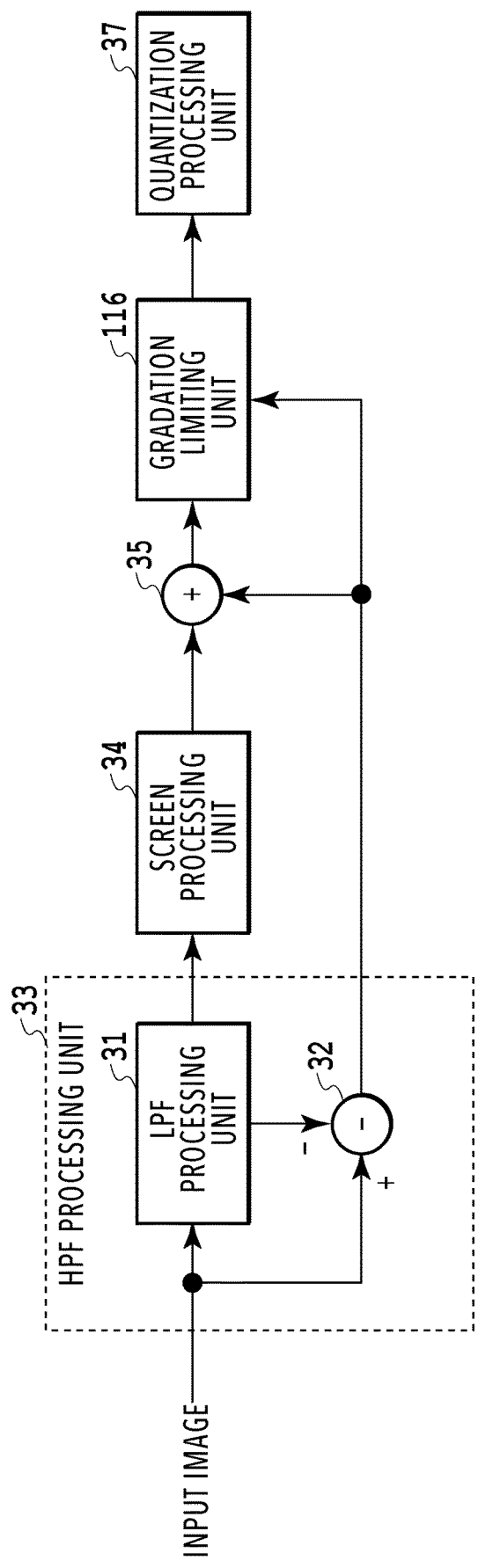
FIG. 11 is a block diagram showing a configuration example of an image processing apparatus that performs halftone processing according to a second embodiment.

FIG. 11 shows a configuration example of an image processing apparatus that performs halftone processing according to this embodiment. A gradation limiting unit 116 in this embodiment, unlike the first embodiment, refers to the high-frequency component image generated by the HPF processing unit 33 and determines correction pixels (pixels to which the clip errors are distributed) and correction amounts (distribution amounts of the clip errors) based on the sign of each pixel. The other constituents are the same as those in the first embodiment.

Figure 12:
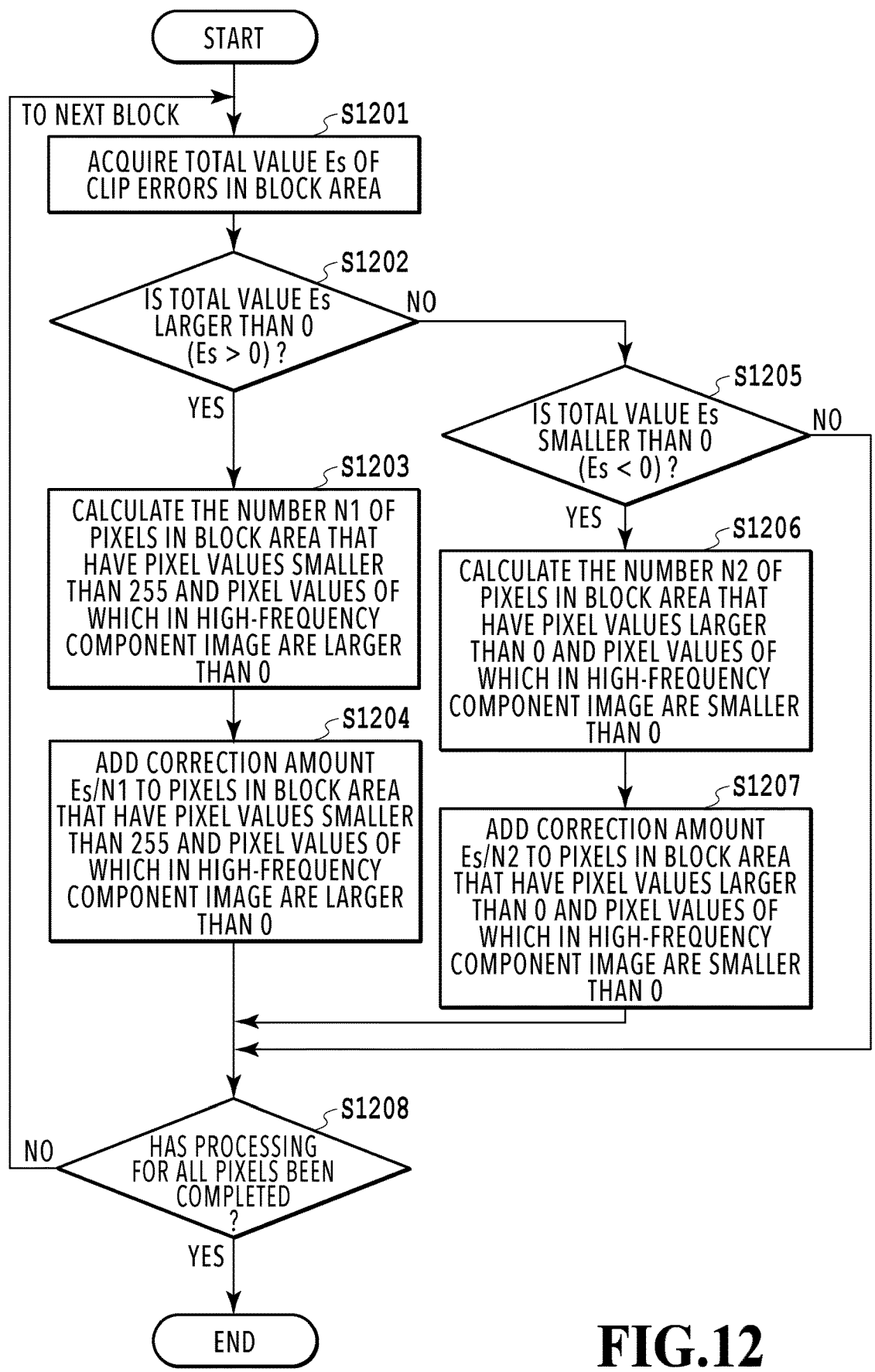
FIG. 12 is a flowchart of gradation limiting processing in the second embodiment.

FIG. 12 is a flowchart showing gradation limiting processing performed by the gradation limiting unit 116 in this embodiment. The gradation limiting unit 116 performs the gradation limiting processing for each block area including a plurality of pixels, included in an image data. Note that it is desirable that the size of the block area be about the same as the cutoff frequency (ScF/2). In this embodiment, one block is 6×6 pixels.

First, at step S1201, the total value Es of clip errors in a block area of interest is acquired in the image data to which the high-frequency components have been added at the addition processing unit 35. Then at step S1202, it is determined whether the acquired total value Es is larger than 0. In a case where the total value Es is larger than 0, the process proceeds to step S1203. On the other hand, in a case where the total value Es is smaller than or equal to 0, the process proceeds to step S1205.

At step S1203, the pixels to which the clip errors are to be distributed are determined for the case where the total value Es of clip errors is larger than 0, and the total number N1 of distribution destination pixels is calculated. Specifically, the pixels that meet the following condition are determined to be the distribution destination pixels. The pixel value of the pixel in the block area of interest in the image data is smaller than 255, and the pixel value of the corresponding pixel in the block area of interest in the high-frequency component image is larger than 0.

Next, at step S1204, the processing to distribute the total value Es of clip errors is performed. Specifically, the distribution amount (correction amount) Es/N1, which is calculated with the total value Es of clip errors and the total number N1 of distribution destination pixels, is added to the pixel value of each of the distribution destination pixels determined at step S1203 for distributing the clip error. Note that in a case where the total number N1 of distribution destination pixels is 0, the distribution processing is not performed.

With the above processing, since the total value Es of clip errors in the block are of interest is distributed to the pixels in which no overflow has occurred (in other words, the pixels the pixel values of which are smaller than 255), it is possible to keep the gradation. In addition, since the destination pixels for distribution clip errors are limited to the pixels the pixel values of which in the high-frequency component image are larger than 0 (the pixels that are desired to be corrected in the positive direction on the high-frequency components), it is possible to keep the reproducibility of high-frequency components.

At step S1205, it is determined whether the acquired total value Es is smaller than 0. In a case where the total value Es is smaller than 0, the process proceeds to step S1206. On the other hand, in a case where the total value Es is larger than or equal 0, the process proceeds to step S1208.

At step S1206, the destination pixels for distributing clip errors are determined for the case where the total value Es of clip errors is smaller than 0, and the total number N2 of distribution destination pixels is calculated. Specifically, the pixels that meet the following condition are determined to be the distribution destination pixels. The pixel value of the pixel in the block area of interest in the image data is larger than 0, and the pixel value of the corresponding pixel in the block area of interest in the high-frequency component image is smaller than 0.

Next, at step S1207, the processing to distribute the total value Es of clip errors is performed. Specifically, the distribution amount Es/N2, which is calculated with the total value Es of clip errors and the total number N2 of distribution destination pixels, is added to the pixel value of each of the distribution destination pixels determined at step S1206 for distributing the clip error. Note that in a case where the total number N2 of distribution destination pixels is 0, the distribution processing is not performed.

With the above processing, since the total value Es of clip errors in the block are of interest is distributed to the pixels in which no underflow has occurred (in other words, the pixels the pixel values of which are larger than 0), it is possible to keep the gradation. In addition, since the destination pixels for distribution clip errors are limited to the pixels the pixel values of which in the high-frequency component image are smaller than 0 (the pixels that are desired to be corrected in the negative direction on the high-frequency components), it is possible to keep the reproducibility of high-frequency components.

At step S1208, it is determined that the processing for all the block areas has been completed. If it is determined that the processing has not been completed, the process moves to the next block area, and steps S1202 to S1207 are repeated. If it is determined that the processing for all the pixels has been completed, the process ends. Note that because the processing in this embodiment can be performed for each block area independently, the parallelization speeds up the processing.

Note that in a case where an overflow or underflow occurs beyond the gradation range after the foregoing processing, the clip processing to limit image date within the gradation range may be performed on the image data.

FIG. 13 shows image data obtained by performing the gradation limiting processing in this embodiment on the image data shown in FIG. 8A in which the high-frequency components have been added to the low-frequency component image data subjected to the AM screen processing. The blocks in this embodiment are the areas, each including 36 pixels, depicted by the thick lines in FIG. 13. The average value of the image data shown in FIG. 13 is 184, which is equal to the average value 184 of the image data before the clip processing. In other words, the gradation limiting processing in this embodiment can suppress the density change. In addition, in this embodiment, since the pixels to which the total value of clip errors for each block is diffused are limited to those desired to be corrected in the direction of the signs on the high-frequency components, it is possible to keep the reproducibility of high-frequency components.

Third Embodiment

In the first and second embodiments, description was provided for the method of suppressing the density change by calculating clip errors from the image data to which the high-frequency component image has been added and then diffusing the clip errors to neighboring pixels. In the third embodiment, description will be provided for a method of correcting the high-frequency component image to suppress the clip error, by calculating the probability that an overflow or underflow beyond the gradation range occurs after addition processing based on the low-frequency component image generated in the LPF processing unit 31. In other words, in this embodiment, the pixel values in the high-frequency component image are corrected such that expected values of addition amounts to be added in a state where pixel values after addition processing are within a specified gradation range are consistent with target pixel values in the high-frequency image. Since the high-frequency component image is corrected in advance before the addition processing, the average gradation can be kept after the clip processing and the density change can be suppressed.

Figure 14:
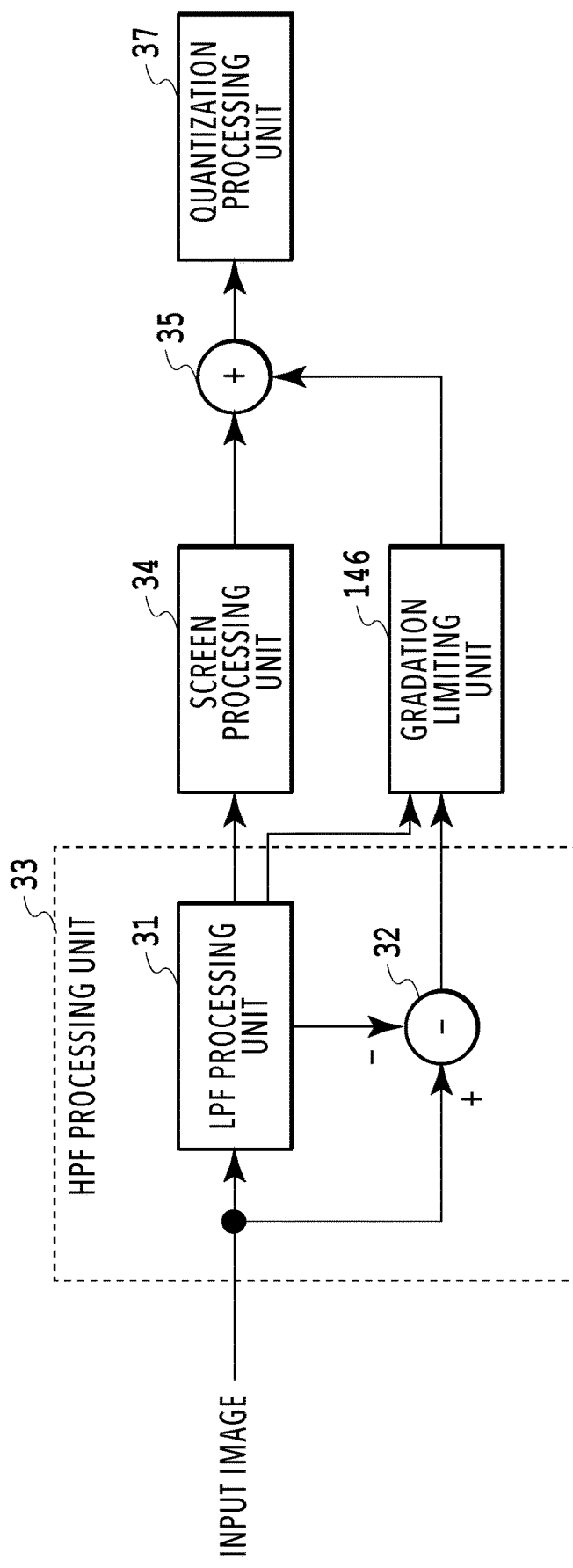
FIG. 14 is a block diagram showing a configuration example of an image processing apparatus that performs halftone processing according to a third embodiment.

FIG. 14 shows a configuration example of an image processing apparatus that performs halftone processing according to this embodiment. A gradation limiting unit 146 in this embodiment, unlike the first and second embodiments, refers to the pixel value of each pixel in the low-frequency component image before the addition processing at the addition processing unit 35 to correct the high-frequency component image.

Figure 15:
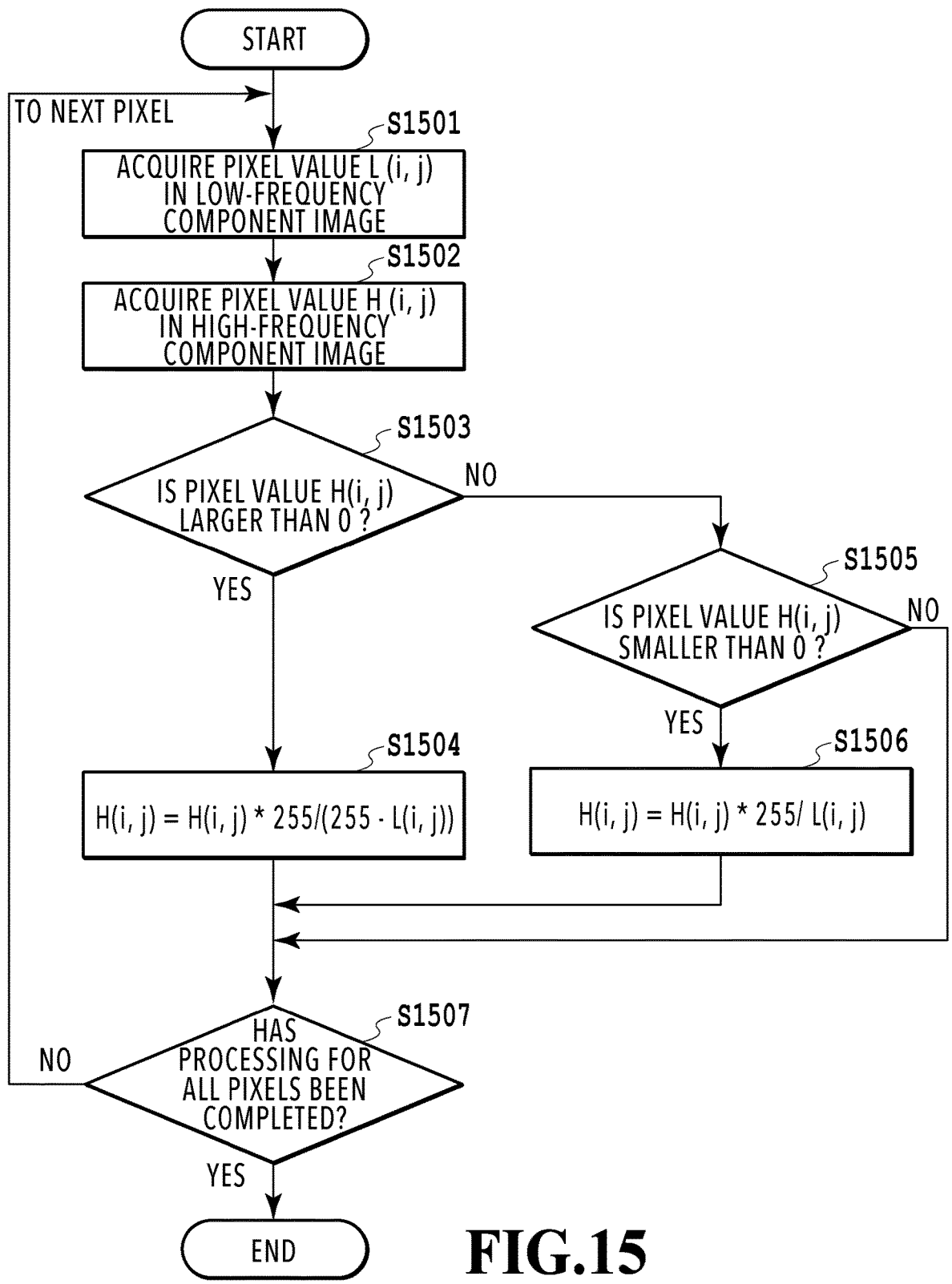
FIG. 15 is a flowchart of the gradation limiting processing according to the third embodiment.

FIG. 15 is a flowchart showing processing performed by the gradation limiting unit 146 in this embodiment. The gradation limiting unit 146 performs gradation limiting processing for each pixel included in the high-frequency component image data.

First, at step S1501, the pixel-of-interest position(i, j) is specified and the pixel value L(i, j) in the low-frequency component image data generated by the LPF processing unit 31 is acquired. In addition, at step S1502, the pixel value H(i, j) of the pixel-of-interest(i, j) in the high-frequency component image data generated by the HPF processing unit 33 are acquired.

At step S1503, it is determined whether the acquired pixel value H(i, j) in the high-frequency component image data is larger than 0. In a case where the pixel value H(i, j) is larger than 0, the process proceeds to step S1504. On the other hand, in a case where the pixel value H(i, j) is smaller than or equal to 0, the process proceeds to step S1505.

At step S1504, the pixel value in the high-frequency component image data, which is to be added in the later addition processing, is corrected based on the pixel value L(i, j) in the low-frequency component image data. Here, the pixel value in the high-frequency component image data is corrected such that the expected value of the addition amount to be added in a state where the output does not exceed (does not overflow) the gradation range in the addition processing to be performed later is consistent with the target pixel value H(i, j).

Hereinafter, description will be specifically provided for a method of calculating high-frequency component image data H'(i, j) after correction for the case where the pixel value H(i, j) is larger than 0.

First, the probability R that the output exceeds (overflows) the gradation range in the addition processing to be performed later is expressed by Formula (1) below. Here, since the pixel value H(i, j) is larger than 0, an overflow occurs in a case where the pixel value in the image after the low-frequency component image data is subjected to the screen processing is 255. The probability that the pixel having the pixel value L(i, j) will have a value 255 after the screen processing (in other words, the probability R that an overflow occurs) is expressed by the following Formula (1).

$$R = L(i, j)/255 \tag{1}$$

Here, the expected value of the addition amount to be added without exceeding the gradation range is expressed by the product of the probability that the addition result does not exceed the gradation range and the high-frequency component image data H'(i, j) which has been corrected not to exceed the gradation range. The probability that the addition result does not exceed the gradation range can be paraphrased as the probability that an overflow does not occur, which is expressed as 1-R.

Since the corrected high-frequency component image data H'(i, j) needs to be calculated such that the expected value of the addition amount is consistent with the target addition amount H(i, j), the relationship between R, H(i, j), and H'(i, j) satisfies the following Formulae (2) and (3).

$$(1 - R) \times H'(i, j) = H(i, j) \tag{2}$$

$$\begin{aligned} H'(i, j) &= H(i, j)/(1 - R) \\ &= H(i, j)/(1 - L(i, j)/255) \\ &= H(i, j) \times 255/(255 - L(i, j)) \end{aligned} \tag{3}$$

In this way, the pixel value in the high-frequency component image data is corrected using the pixel value H'(i, j) calculated by Formula (3).

At step S1505, it is determined whether the acquired pixel value H(i, j) in the high-frequency component image data is smaller than 0. In a case where the pixel value H(i, j) is smaller than 0, the process proceeds to step S1506. On the other hand, in a case where the pixel value H(i, j) is larger than or equal to 0, the process proceeds to step S1507.

At step S1506, the pixel value in the high-frequency component image data that will be added in the later addition processing is corrected based on the pixel value L(i, j) of the low-frequency component image data. Here, the pixel value in the high-frequency component image data is corrected such that the expected value of the addition amount to be added in a state the output does not fall below (does not underflow) the gradation range in the addition processing to be performed later is consistent with the target pixel value H(i, j).

Hereinafter, description will be specifically provided for a method of calculating the high-frequency component image data H'(i, j) after correction for the case where the pixel value H(i, j) is smaller than 0.

First, the probability R that the output falls below (underflows) the gradation range in the addition processing to be performed later is expressed by Formula (4) below. Here, since the pixel value H(i, j) is smaller than 0, an underflow occurs in a case where the pixel value in the image after the low-frequency component image data is subjected to the screen processing is 0. The probability that the pixel having the pixel value L(i, j) will have a value 0 after the screen processing (in other words, the probability R that an underflow occurs) is expressed by the following Formula (4).

$$R = 1 - L(i, j)/255 \tag{4}$$

As in step S1504 described above, since the corrected high-frequency component image data H'(i, j) needs to be calculated such that the expected value of the addition amount is consistent with the target addition amount H(i, j), the following Formula (5) holds.

$$H'(i, j) = H(i, j)/(1 - R) \quad (5)$$
$$= H(i, j)/(L(i, j)/255)$$
$$= H(i, j) \times 255/L(i, j)$$

As described above, the pixel values in the high-frequency component image data are corrected using the pixel value H'(i, j) calculated with Formula (5).

At step S1507, it is determined whether the processing for all the pixels has been completed. If it is determined that the processing has not been completed, the pixel of interest is moved to the next pixel, and steps S1501 to S1506 are repeated. If it is determined that the processing for all the pixels has been completed, the process ends.

Figure 16A:
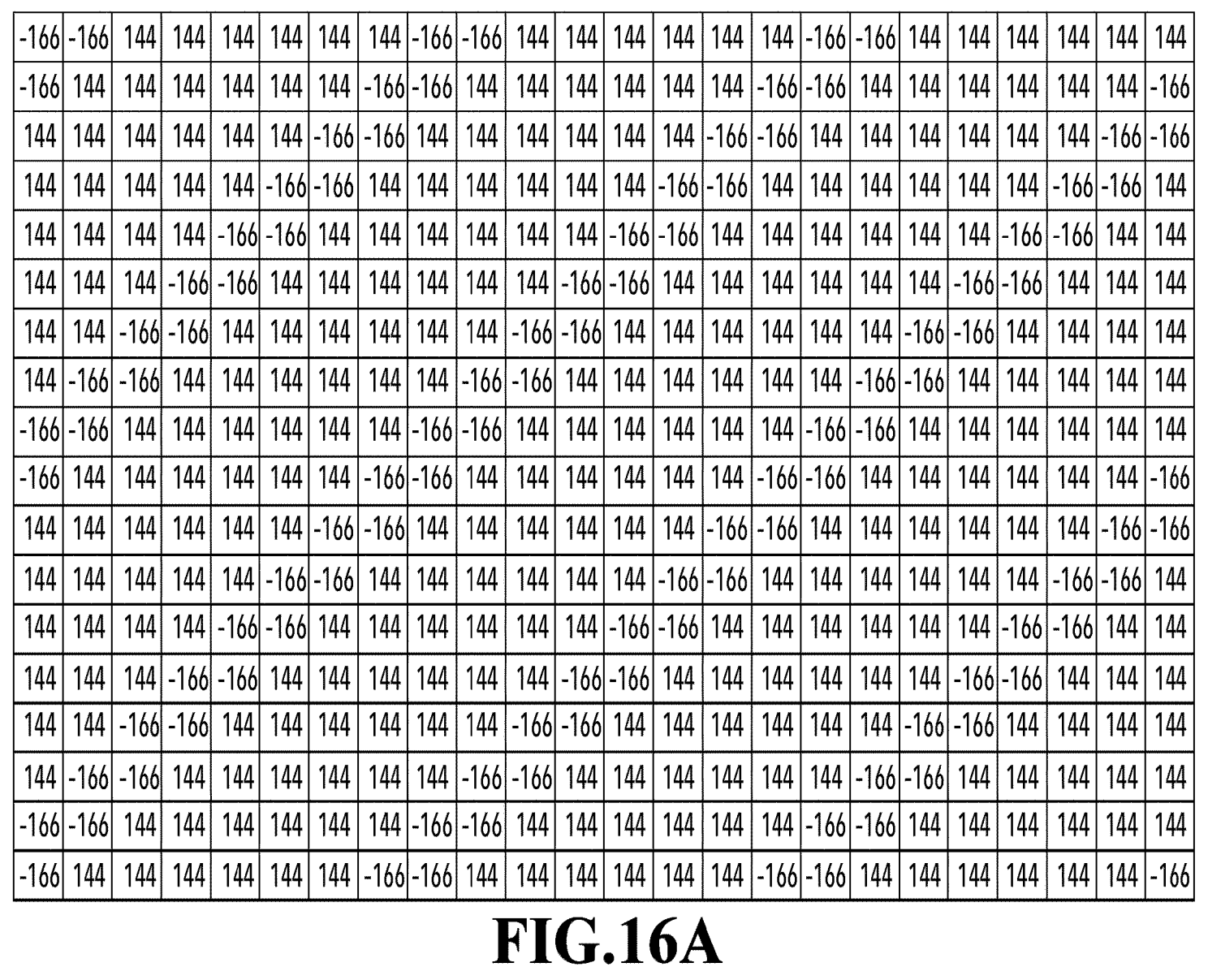
Figure 16B:
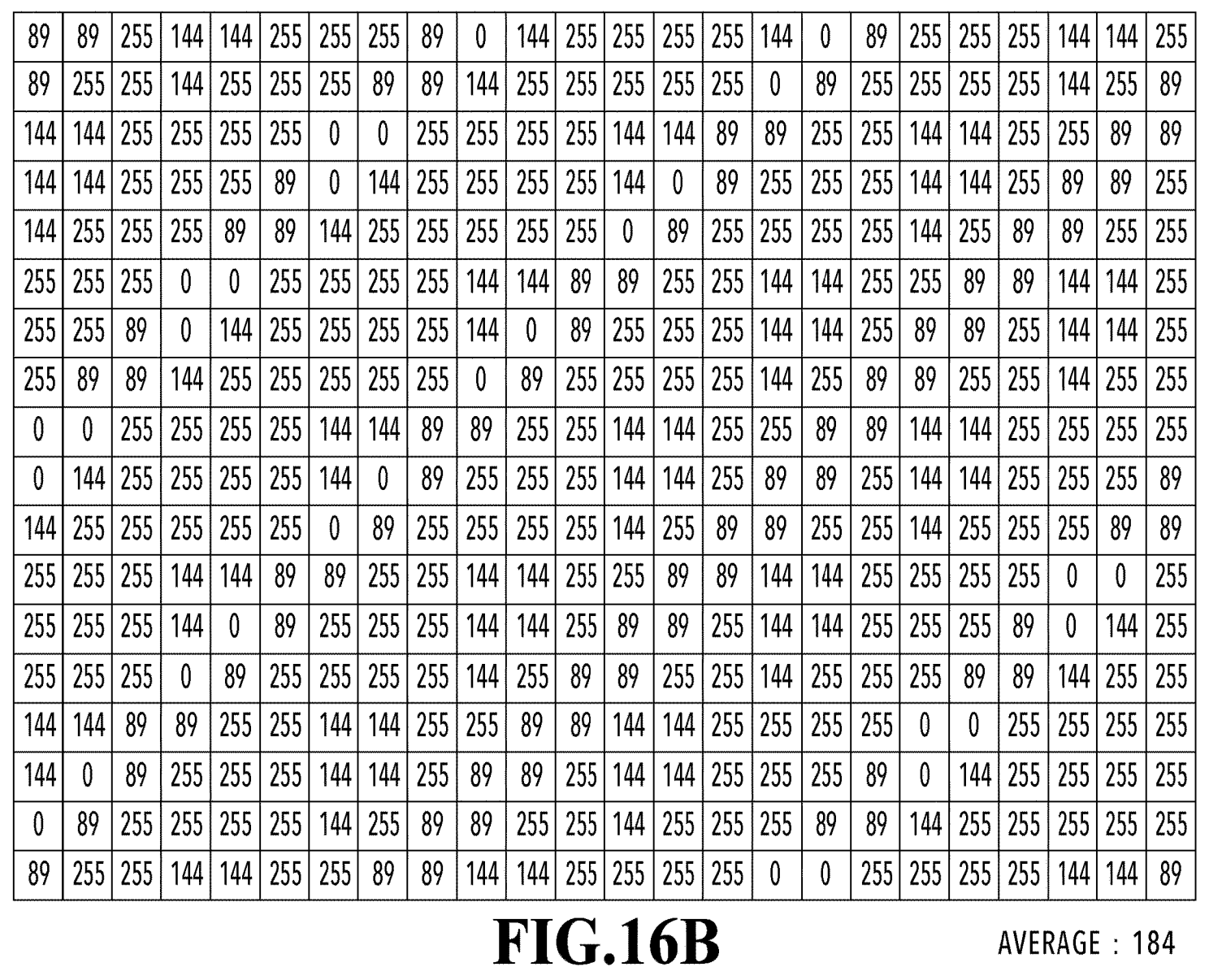

FIG. 16A shows image data obtained by performing the gradation limiting processing according to this embodiment on the high-frequency component image data shown in FIG. 5C. FIG. 16B shows the result obtained by adding the high-frequency component image data subjected to the gradation limiting processing, shown in FIG. 16A, to the low-frequency component image data subjected to the AM screen processing, shown in FIG. 7B, and then performing the clip processing to convert the resultant data into the 8-bit gradation range.

The average value of the image data shown in FIG. 16B is 184, which is equal to the average value 184 of the low-frequency component image data. In this embodiment, since the probability of occurrence of an overflow or underflow is calculated from the low-frequency component image, and the high-frequency image before the addition processing is corrected to suppress the clip error, it is possible to keep the average gradation after the clip processing and suppress the density change. In addition, in this embodiment, for the pixel values of the high-frequency components, only the intensity is corrected based on the probability R of occurrence of an overflow or underflow, and the direction of positive or negative of the correction is not changed. Thus, it is possible to keep the reproducibility appropriately based on the signs of the high-frequency component image (the pixels that needs to be corrected in the directions of the signs on the high-frequency components).

In addition, the processing in this embodiment can be performed independently for each pixel, and the amount of calculation is small. Thus, the processing can be further sped up compared to the first and second embodiments. (Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention provides halftone processing result having suppressed interference between an AM screen and high-frequency components included in an input image and good reproducibility of the high-frequency components.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-136446, filed Jul. 12, 2017, which is hereby incorporated by reference wherein in its entirety.

What is claimed is:

1. An image processing apparatus comprising:
one or more processors; and
one or more memories that store instructions executable by the one or more processors to cause the image processing apparatus to act as plurality of units comprising:
(1) a first generation unit that generates a low-frequency image by extracting a low-frequency component from an input image;
(2) a second generation unit that generates a high-frequency image by extracting a high-frequency component from the input image;
(3) a screen processing unit that generates an AM screen image by performing AM screen processing on the low-frequency image;
(4) an addition processing unit that generates an added image by adding the high-frequency image to the AM screen image; and
(5) a correction unit that corrects the added image,
wherein the added image is an image in which a pixel value out of a specified gradation range was replaced with a pixel value within the specified gradation range as a result of adding the high-frequency image to the AM screen image, and
wherein the correction unit distributes a difference between the pixel value before the replacement and the pixel value after the replacement occurred in the pixel the pixel value of which was replaced with the pixel value within the specified gradation range, to pixels other than the pixels the pixel value of which was replaced with the pixel value within the specified gradation range.

2. The image processing apparatus according to claim 1, wherein
the correction unit performs gradation limiting processing for each pixel on a result obtained by adding the high-frequency image and corrects the added image after the gradation limiting processing.

3. The image processing apparatus according to claim 2, wherein
the correction unit repeats processing to set an unprocessed pixel as the pixel of interest after performing the gradation limiting processing on a pixel of interest in a result of the addition of the high-frequency image and distributing the difference to peripheral pixels of the pixel of interest.

4. The image processing apparatus according to claim 1, wherein
the first generation unit extracts a low-frequency component lower than a specified cutoff frequency from the input image, and
wherein the second generation unit extracts a high-frequency component higher than the specified cutoff frequency from the input image.

5. The image processing apparatus according to claim 4, wherein
the specified cutoff frequency is lower than or equal to half of an AM screen frequency in the screen processing unit.

6. The image processing apparatus according to claim 1, wherein
the correction unit diffuses the difference to peripheral pixels of a pixel of interest in the added image.

7. The image processing apparatus according to claim 1, wherein
the correction unit weights the difference and diffuses the weighted difference to peripheral pixels of a pixel of interest in the added image.

8. The image processing apparatus according to claim 1, wherein
the correction unit calculates a total value of errors for each specified block area including a plurality of pixels, each error being a difference between a pixel value of each of the a plurality of pixels and the specified gradation range, and the correction unit distributes the total value to the plurality of pixels included in the specified block area based on a pixel value in the high-frequency image.

9. The image processing apparatus according to claim 8, wherein
in a case where the total value is larger than 0, the correction unit distributes the total value to pixels that have a pixel value smaller than a maximum value of the gradation range in the block area and corresponding pixels of which in the high-frequency image have a pixel value larger than 0, and
wherein in a case where the total value is smaller than 0, the correction unit distributes the total value to pixels that have a pixel value larger than a minimum value of the gradation range in the block area and corresponding pixels of which in the high-frequency image have a pixel value smaller than 0.

10. The image processing apparatus according to claim 9, wherein
in a case where the total value is larger than 0, the correction unit calculates, as the first number of pixels, the number of pixels that have a pixel value smaller than the maximum value of the gradation range in the block area, and corresponding pixels of which in the high-frequency image have a pixel value larger than 0, and the correction unit adds a value obtained by dividing the total value by the first number of pixels to pixels that have a pixel value smaller than the maximum value of the gradation range and corresponding pixels of which in the high-frequency image have a pixel value larger than 0, and
wherein in a case where the total value is smaller than 0, the correction unit calculates, as the second number of pixels, the number of pixels that have a pixel value larger than the minimum value of the gradation range in the block area, and corresponding pixels of which in the high-frequency image have a pixel value smaller than 0, and the correction unit adds a value obtained by dividing the total value by the second number of pixels to pixels that have a pixel value larger than the minimum value of the gradation range and corresponding pixels of which in the high-frequency image have a pixel value smaller than 0.

11. The image processing apparatus according to claim 8, wherein
in a case where the total value in the block area is 0, the correction unit does not perform correction.

12. The image processing apparatus according to claim 8, wherein
the first generation unit extracts a low-frequency component lower than a specified cutoff frequency from the input image, and
wherein the specified block area has a size set in accordance with the cutoff frequency.

13. The image processing apparatus according to claim 1, wherein
the correction unit corrects a pixel value in the high-frequency image based on a pixel value in the low-frequency image such that an expected value of an addition amount to be added in a state where a pixel value after the addition processing is within the specified gradation range is consistent with a target pixel value in the high-frequency image.

14. An image processing method performed by an image processing apparatus including one or more processors and one or more memories that store instructions executable by the one or more processors, the method comprising the steps of:
generating a low-frequency image by extracting a low-frequency component from an input image;
generating a high-frequency image by extracting a high-frequency component from the input image;
generating an AM screen image by performing AM screen processing on the low-frequency image;
generating an added image by adding the high-frequency image to the AM screen image; and
correcting the added image, wherein
the added image is an image in which a pixel value of pixels out of a specified gradation range was replaced with a pixel value within the specified gradation range as a result of adding the high-frequency image to the AM screen image, and
wherein the correcting the added image includes distributing a difference between the pixel value before the replacement and the pixel value after the replacement occurred in the pixel the pixel value of which was replaced with the pixel value within the specified gradation range, to pixels other than the pixels the pixel value of which was replaced with the pixel value within the specified gradation range.

15. The image processing method according to claim 14, wherein
the correcting the added image includes: performing gradation limiting processing for each pixel on a result obtained by adding the high-frequency image; and correcting the added image after the gradation limiting processing.

16. The image processing method according to claim 14, wherein the generating the low-frequency image includes extracting a low-frequency component lower than a specified cutoff frequency from the input image, and wherein the generating the high-frequency image includes extracting a high-frequency component higher than the specified cutoff frequency from the input image.

17. The image processing method according to claim 14, wherein the correcting the added image includes weighting the difference and diffusing the weighted difference to peripheral pixels of a pixel of interest in the added image.

18. The image processing method according to claim 14, wherein the correcting the added image includes:

calculating a total value of errors for each specified block area including a plurality of pixels, each error being a difference between a pixel value of each of the plurality of pixels and the specified gradation range; and distributing the total value to the plurality of pixels included in the specified block area based on a pixel value in the high-frequency image.

19. The image processing method according to claim 14, wherein the correcting the added image includes:

in a case where the total value is larger than 0, distributing the total value to pixels that have a pixel value smaller than a maximum value of the gradation range in the block area and corresponding pixels of which in the high-frequency image have a pixel value larger than 0; and in a case where the total value is smaller than 0, distributing the total value to pixels that have a pixel value larger than a minimum value of the gradation range in the block area and corresponding pixels of which in the high-frequency image have a pixel value smaller than 0.

20. A non-transitory computer-readable storage medium storing a program for causing a computer to perform an image processing method, the method comprising the steps of:

generating a low-frequency image by extracting a low-frequency component from an input image;

generating a high-frequency image by extracting a high-frequency component from the input image;

generating an AM screen image by performing AM screen processing on the low-frequency image;

generating an added image by adding the high-frequency image to the AM screen image; and correcting the added image, wherein the added image is an image in which a pixel value out of a specified gradation range was replaced with a pixel value within the specified gradation range as a result of adding the high-frequency image to the AM screen image, and wherein the correcting the added image includes distributing a difference between the pixel value before the replacement and the pixel value after the replacement occurred in the pixel the pixel value of which was replaced with the pixel value within the specified gradation range, to pixels other than the pixels the pixel value of which was replaced with the pixel value within the specified gradation range.

\* \* \* \* \*